United States Patent [19]

Matsumani et al.

[11] Patent Number: 5,619,690
[45] Date of Patent: Apr. 8, 1997

[54] COMPUTER SYSTEM INCLUDING A COMPUTER WHICH REQUESTS AN ACCESS TO A LOGICAL ADDRESS IN A SECONDARY STORAGE SYSTEM WITH SPECIFICATION OF A LOCAL ADDRESS IN THE SECONDARY STORAGE SYSTEM

[75] Inventors: Naoto Matsumani, Yokohama; Soichi Isono, Chigasaki; Jun Matsumoto, Tokyo; Minoru Yoshida, Odawara, all of Japan

[73] Assignee: Hitachi, Ltd., Tokyo, Japan

[21] Appl. No.: 262,933

[22] Filed: Jun. 21, 1994

[30] Foreign Application Priority Data

Jun. 21, 1993 [JP] Japan ................................. 5-149467

[51] Int. Cl.$^6$ ....................................................... G06F 17/30
[52] U.S. Cl. ........................... 395/616; 345/427; 345/439
[58] Field of Search ..................................... 395/600, 425, 395/200, 575, 375, 427, 439; 375/371; 370/85.15

[56] References Cited

U.S. PATENT DOCUMENTS 5,001,628 3/1991 Johnson et al. ......................... 395/600
5,163,131 11/1992 Row et al. .............................. 395/200
5,230,045 7/1993 Sindu ..................................... 395/425
5,249,279 9/1993 Schmenk et al. ....................... 395/425

*Primary Examiner*—Thomas G. Black
*Assistant Examiner*—Paul R. Lintz
*Attorney, Agent, or Firm*—Antonelli, Terry, Stout & Kraus, LLP

[57] ABSTRACT

When file and command management means in a secondary storage system is instructed to store a new file by a command containing file identification information from a host computer, the means transfers it to new file address determination means, which then references a disk management table to find a free area and considers characteristics of the file, the configuration of the secondary storage system, etc., to determine an optimum area as an area for registering the new file. Also, the address of the determined area is related to file identification information of the file and a correspondence therebetween is registered in a local file management table. The file and command management means stores the file in the determined area in a disk unit via a disk unit controller. Then, file placement optimization can be carried out independently of the type of secondary storage system.

11 Claims, 24 Drawing Sheets

FILE MANAGEMENT TABLE

FIG. 14
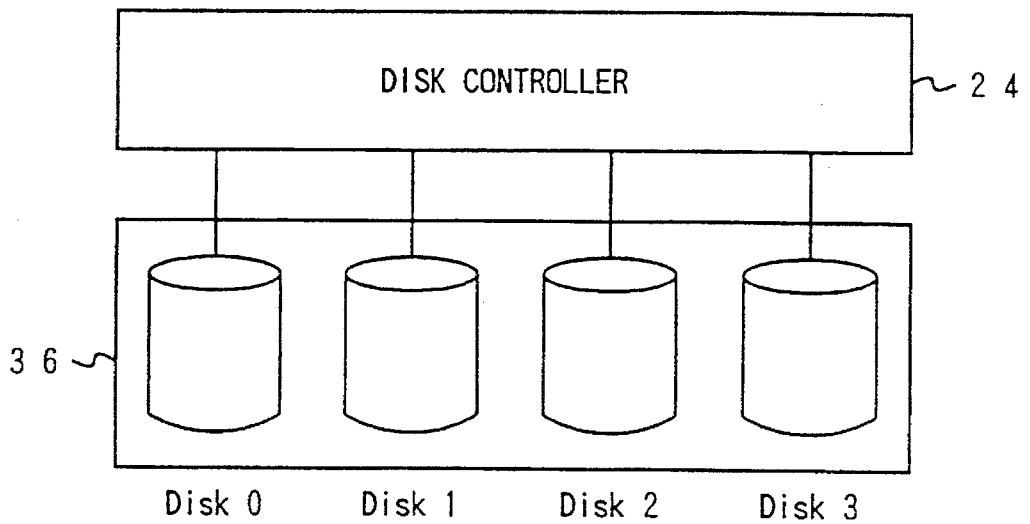
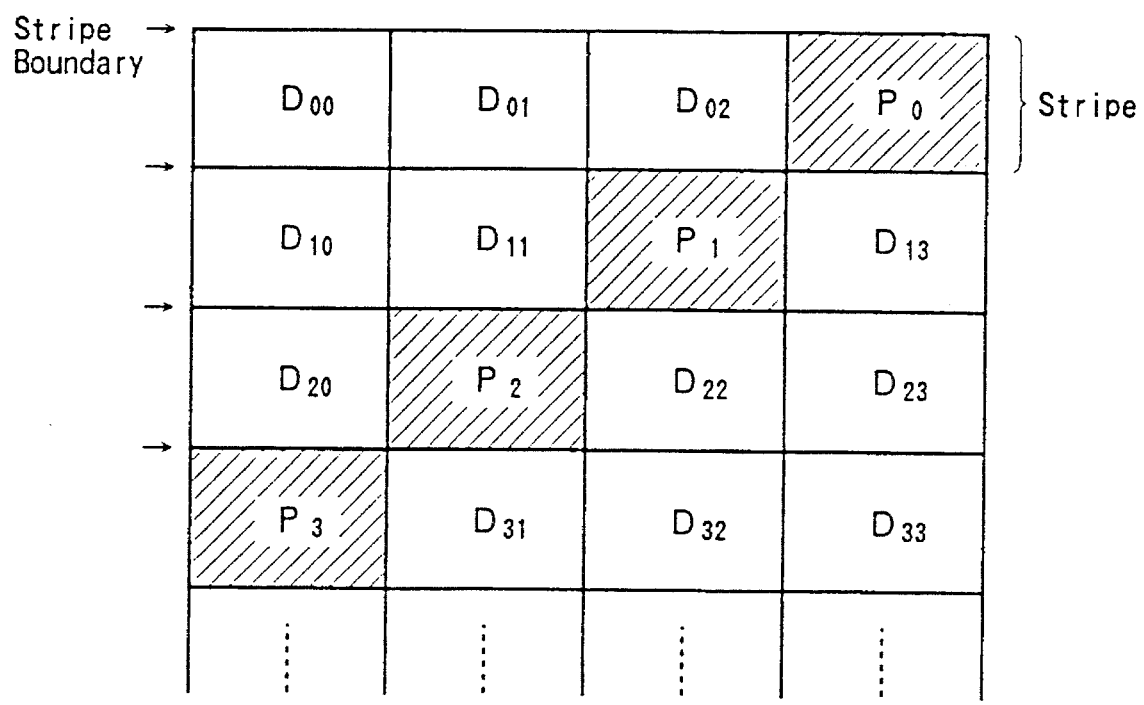

FIG. 17

STRIPE MANAGEMENT TABLE 1700

| STRIPE | Disk 0 | Disk 1 | Disk 2 | Disk 3 |
|---|---|---|---|---|
| #n | 0 0 0 | 0 0 0 | 0 0 0 | 1 0 0 |
| #n+1 | 0 0 0 | 0 0 0 | 1 0 0 | 0 0 0 |
| #n+2 | 0 1 0 | 0 1 1 1 | 0 1 1 | 0 1 0 |
| #n+3 | 0 0 0 | 0 1 0 | 0 0 0 | 0 0 0 |

0 0 0 : Unused data stripe
0 1 0 : Partially used data stripe
0 1 1 : Wholly used data stripe
1 0 0 : Unused parity stripe
1 1 0 : Partially used parity stripe
1 1 1 : Wholly used parity stripe

SECTOR MANAGEMENT TABLE 1710

| STRIPE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| #n | 0 | 0 | 0 | 0 | 0 | 0 | 0 | 0 | 0 | 0 | 0 | 0 | 0 | 0 | 0 | 0 |
| #n+1 | 0 | 0 | 0 | 0 | 0 | 0 | 0 | 0 | 0 | 0 | 0 | 0 | 0 | 0 | 0 | 0 |
| #n+2 | 1 | 1 | 1 | 1 | 1 | 1 | 1 | 1 | 0 | 0 | 0 | 0 | 0 | 0 | 0 | 0 |
| #n+3 | 1 | 1 | 1 | 1 | 0 | 0 | 0 | 0 | 0 | 0 | 0 | 0 | 0 | 0 | 0 | 0 |

SECTOR NUMBER

······ Disk 0

0 : Unused sector
1 : Used sector

STRIPE SIZE $S_1$ < $S_2$ < $S_3$

COMPUTER SYSTEM INCLUDING A COMPUTER WHICH REQUESTS AN ACCESS TO A LOGICAL ADDRESS IN A SECONDARY STORAGE SYSTEM WITH SPECIFICATION OF A LOCAL ADDRESS IN THE SECONDARY STORAGE SYSTEM

BACKGROUND OF THE INVENTION

1. Field of the Invention

This invention relates to a computer system which comprises a host computer and a secondary storage system and, in particular, to techniques of file placement optimization in the secondary storage system.

2. Description of the Related Art

Known as a computer system which comprises a host computer and a secondary storage system is a system in which hard disk units, hereinafter simply called disk units, are connected to workstations (WSs) using an operating system (OS) known as UNIX.

The art described in "The Design and Implementation of the 4.3BSD UNIX Operating System" Maruzen, published in 1991 is known as file management techniques for such a computer system.

The art will be discussed.

FIG. 24 shows the configuration of the computer system.

In the figure, numeral 1 is a host computer and numeral 2 is a secondary storage system.

In the host computer 1, numeral 20 denotes an OS and numeral 12 denotes a process of an application program (AP) executed by the user managed by the OS 20. That is, application programs executed in the host computer are managed as processes 12 by the OS 20.

In the OS 20, numeral 13 indicates file and buffer management means for managing files and buffers used to transfer data when files are accessed, numeral 15 indicates a file management table for describing information to relate logical addresses of files and directories (addresses in the OS) to corresponding local addresses (addresses in disk units), and numeral 14 indicates a directory management table for describing directory information (information to relate directory and file names to the file management table). Numeral 16 indicates a device driver for converting and controlling file access requests from the file and buffer management means 13 conforming to physical characteristics of various peripheral devices such as a secondary storage system, numeral 30 indicates file address determination means for determining the local address of an optimum disk unit for writing when a new file is written, numeral 25a indicates a disk management table for managing the usage states of disks, and numerals 21 and 22 are interface controllers for controlling communication and data transfer between the host computer and the secondary storage system. In this specification, the term "logical address" indicates a logical address for managing files in the host computer and the term "local address" indicates a local address for a secondary storage system (a disk unit) to manage files. The local address may be a logical address or a physical address. For example, in a disk unit adopted SCSI (Small Computer System Interface), SCSI disk, a logical successive number (LBA: logical block address) is used as a local address. On the other hand, in the IDE (Intelligent Device Electronics) disk etc., a physical address such as a head number, cylinder number, or sector number, which represents a physical position of storing directly is used as a local address.

Next, in the secondary storage system 2, numeral 29 indicates at least one disk unit, numeral 24 indicates a disk controller for controlling the disk units 29, and numeral 23 indicates command management means for receiving and analyzing read and write commands from the host computer, preparing disk commands appropriate to the disk unit, and sending the commands to the disk controller 24.

File access processing executed for process 12 to access an already existing file will now be described.

To access a file, the process 12 issues a file access read or write request (system call) to the OS 20.

When receiving the request, the file and buffer management means 13 in the OS 20 references the directory management table 14 to find the location of the file management table 15 from the file name of the file to be accessed. Next, it references the found file management table 15 to calculate a logical address at which read (or write) file data requested by the process exists (or is to be registered) and converts the logical address into a local address in the secondary storage system. Also, it reserves a buffer area required for data transfer.

Next, the OS 20 sends an access request to the device driver 16 with the calculated local address. When receiving the access request, the device driver 16 prepares a command conforming to the physical characteristics of the secondary storage system 2 in which the file is stored (or to be stored), and sends the command via the interface controller 21 to the secondary storage system 2.

In the secondary storage system 2, the command management means 23 receives the command via the interface controller 22, and analyzes the command. Based on the command analysis results such as the access type, access start address, and data length, the command management means 23 prepares a disk command proper to the disk unit 29 and requests the disk controller 24 to execute the command. The disk controller 24 executes the command to control the disk unit 29 for executing appropriate data transfer processing.

When the process 12 accesses an already existing file, the local address in the secondary storage system 2 at which the file is to be stored must be determined.

Then, to create a new file, new registration processing needs to be performed before file access (write) processing, as described below:

When receiving a request for writing a new file from the process 12, the file and buffer management means 13 registers a file name of the new file in the directory management table 14, reserves a management data area for the file, and registers the location in the directory management table 14. Next, while referencing the disk management table 25a, the file address determination means 30 determines an optimum address, namely, the address of such an area in which the minimum seek is performed with no useless rotational delay according to a predetermined placement algorithm in response to physical characteristic parameters such as the numbers of heads, cylinders, and sectors of disk unit preset by the user. The file address determination means 30 registers the determined address in the file management table 15 to relate it to a logical address.

This new registration processing makes it possible to access the file in a later access by normal file access processing performed by referencing both the directory management table 14 and the file management table 15.

According to the art described in "The Design and Implementation of the 4.3BSD UNIX Operating System"

Maruzen, published in 1991, the physical parameters of the secondary storage system of the disk units, etc., must be preset to determine the optimum address in which a newly created file is to be stored, as described above.

On the other hand, in recent years, with demands for large capacity, high performance, and high reliability, various secondary storage systems in advanced and complicated forms have emerged, such as a disk array system in which disks are laid out like an array, and data is divided for placement on each disk unit, rather than simple connection of one or more disk units to a computer system.

Thus, the physical parameters of the secondary storage system become diversified including, not only parameters of a single disk, but also parameters of the array configuration, data distribution system, placement of redundant data calculated from data on a number of disk units to accomplish high reliability, etc., depending on the architecture of the secondary storage system. Generally, host computers and secondary storage systems are distributed separately and the parameters of a secondary storage system cannot be preset for a host computer by the manufacturer of the secondary storage system.

Thus, the parameters of the secondary storage system will be set by the user, but it is difficult for the user to set all parameters of the secondary storage system; in fact, the user may be unable to set the parameters in many cases. Consequently, file placement optimization in a complicated secondary storage system becomes difficult at the host computer; performance of the secondary storage system cannot be used efficiently.

SUMMARY OF THE INVENTION

It is therefore an object of the invention to provide a computer system which can accomplish optimum placement of files in a secondary storage system without setting the parameters of the secondary storage system in a host computer.

To this end, according to the invention, there is provided, in a computer system comprising a host computer and one or more secondary storage systems connected to the computer, and the improvement lies wherein the secondary storage system comprises means for storing a file consisting of one or more logical blocks; means for executing an access to a logical block, already stored in the storage means, that is requested by the computer specifying a local address in a secondary storage system; means for determining a local address to store the logical block requested to be stored according to a predetermined procedure when the computer requests storing a new logical block in the storage means; means for storing the logical block requested to be stored in the determined local address; and means for notifying the computer of the determined local address, and wherein the host computer comprises a file management table for relating local addresses, where logical blocks making up a file stored in the secondary storage system are stored, to each of logical blocks and for managing the correspondence therebetween; means, when a logical block already stored in the secondary storage system is accessed, for referencing the file management table to find a local address of the logical block to be accessed and sending a request for accessing the logical block to the secondary storage system with specification of the found local address; means, when a new logical block is stored in the secondary storage system, for sending a request for storing the new logical block to the secondary storage system without specifying a local address; and means for relating the local address, returned from the secondary storage system, to the new logical block requested to be stored and registering the correspondence therebetween in the file management table.

According to the computer system of the invention, to store a new logical block in a secondary storage system, the host computer requests the secondary storage system to store the logical block without specifying a local address in the secondary storage system. On the other hand, when receiving the request for storing the new logical block in the storage means from the host computer, the secondary storage system determines a local address in the secondary storage system to store the logical block requested to be stored and stores the logical block requested to be stored in the determined local address, and then notifies the host computer of the determined local address. The host computer relates the notified local address to the new logical block requested to be stored and registers the correspondence therebetween in the file management table. After this, to access the logical block, the host computer references the file management table to designate the local address corresponding to the logical block and sends an access request to the secondary storage system with specification of the local address of the logical block to be accessed.

Thus, according to the invention, local addresses to store logical blocks making up a file are determined by the secondary storage system. Since it is easy to make each secondary storage system comprehend their own configurations and usage state, the secondary storage systems can determine optimum locations to store logical blocks. Therefore, optimum placement of files in the secondary storage systems can be accomplished without setting the parameters of the secondary storage systems in the host computer.

BRIEF DESCRIPTION OF THE DRAWINGS

In the accompanying drawings:

FIG. 14 is an illustration showing stripes in a disk array system;

FIG. 17 is a drawing showing the formats of a stripe management table and a sector management table according to the invention;

DESCRIPTION OF THE PREFERRED EMBODIMENTS

Referring now to the accompanying drawings, there are shown preferred embodiments of a computer system according to the invention.

Figure 1:
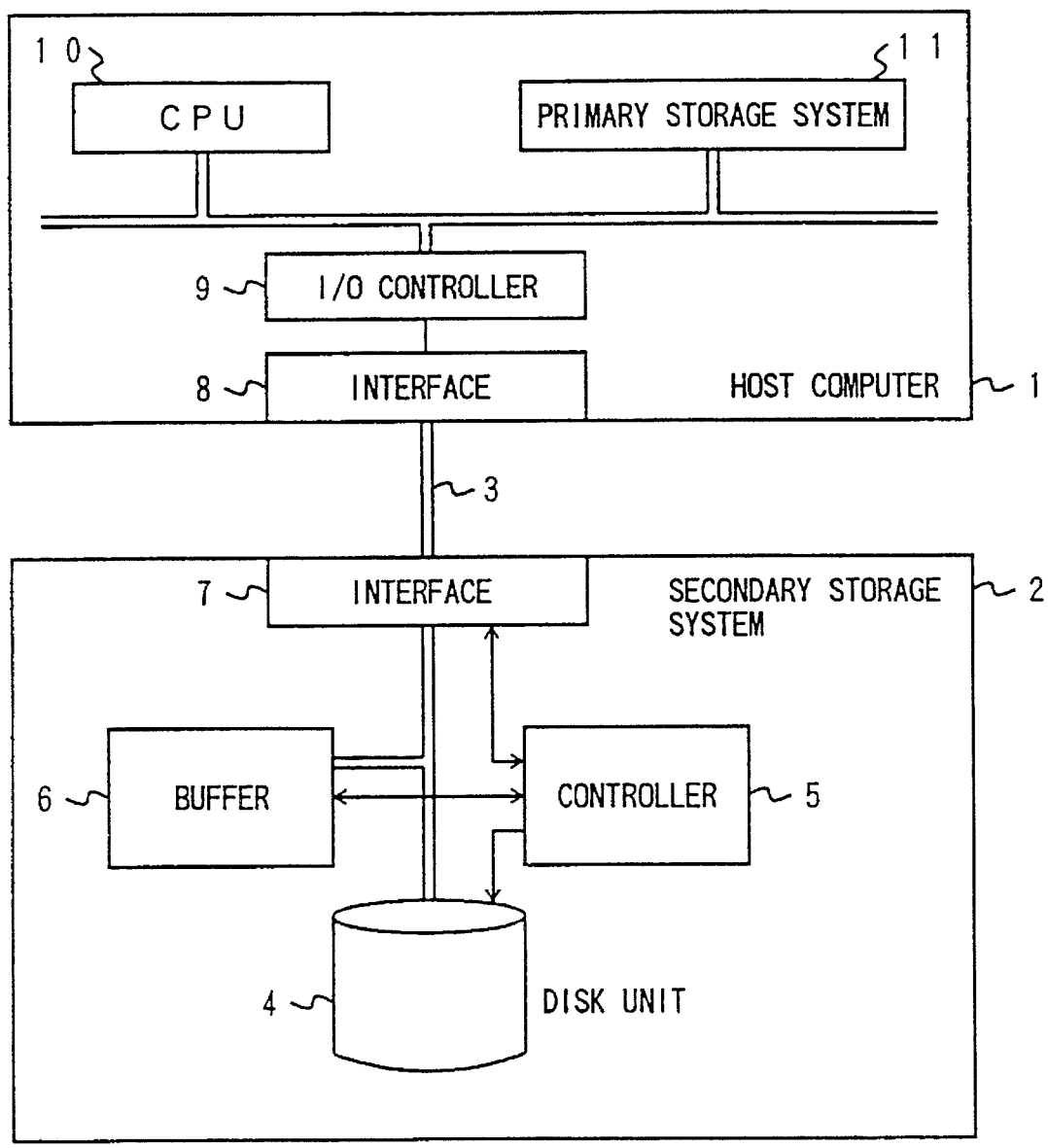
FIG. 1 is a block diagram showing the hardware configuration of a computer system according to the invention.

First, FIG. 1 shows a hardware configuration example of a computer system according to the invention.

As shown here, the computer system according to the invention comprises a host computer 1 and a secondary storage system 2. The host computer 1 consists of a CPU 10 which executes OS and application programs, a primary storage system 11 used by the CPU 10, an I/O controller 9 which controls input/output requests (I/O requests) from/to the secondary storage system 2, and an interface 8 to the secondary storage system 2.

On the other hand, the secondary storage system 2 consists of an interface 7 through which I/O requests from the host computer 1 are sent and transferred, a controller 5 which controls data transfer and the internal operation of the secondary storage system, a disk unit 4 for storing data, and a buffer 6 for absorbing the data transfer rate difference between the disk unit 4 and the host computer 1.

The hardware configuration of the computer system according to the invention may be another conforming to the configuration shown in FIG. 1.

Next, a management system of logical locations of files and local locations in secondary storage system in the computer system according to the invention will be discussed.

Figure 2:
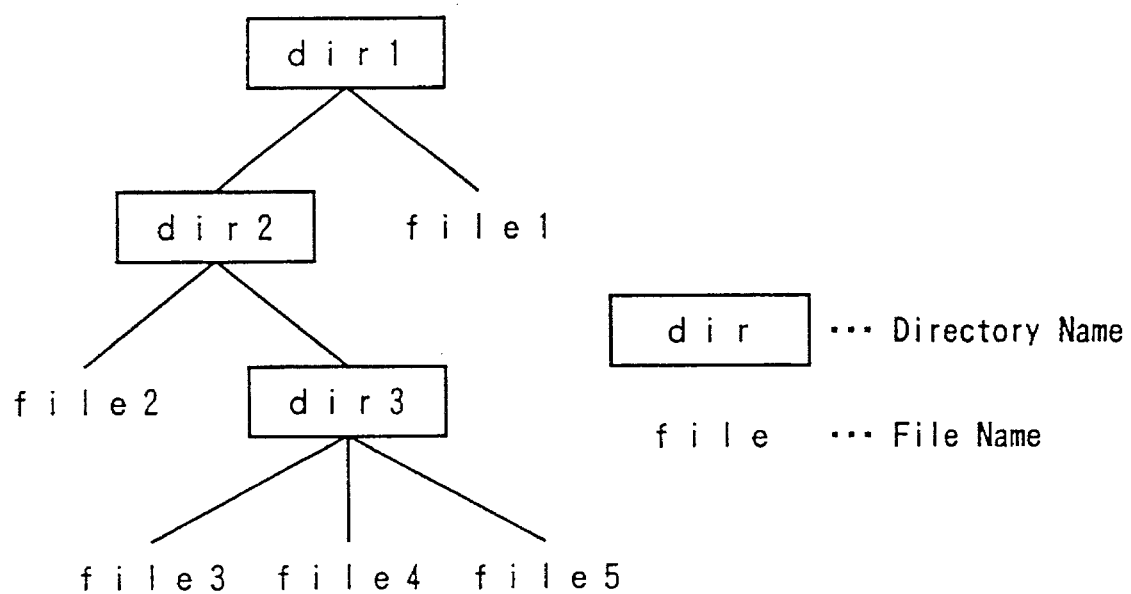
FIG. 2 is an illustration showing the concept of file management in the computer system according to the invention.

As shown in FIG. 2, the logical locations of files are managed hierarchically using a tree structure constructed with directories; this is a system adopted in OSs such as UNIX mentioned above.

In the system, each file is stored for each block which is a collection of predetermined-length data in a real storage area of the secondary storage system. The local location of a file is managed by managing the logical addresses where each of blocks making up the file is stored and the addresses in the secondary storage system corresponding to each of the logical addresses. Hereinafter, the address in the secondary storage system is called a local address.

However, the logical locations of files and local locations in the secondary storage system may be managed by a system conforming to such a management system.

To store a new file in the secondary storage system 2, blocks into which the file is divided need to be mapped into local addresses according to an optimization algorithm as a part of the new registration processing described above. However, if the secondary storage system 2 comprises a number of corrected disk units or has a complicated configuration in which data is distributed to a number of disk units conforming to so-called RAID (redundant arrays of inexpensive disks) architecture, it is extremely difficult to input the optimization algorithm and diversified parameters to the host computer 1 in response to the type of secondary storage system being used. Thus, normally a conventional algorithm is used as if the secondary storage system 2 were a conventional simple secondary storage system. However, if the system is used so, potential capabilities of the secondary storage system cannot be developed; in the worst case, only low performance can be expected even as compared with the former secondary storage system.

Now, a first embodiment of the invention will be discussed.

Figure 3:
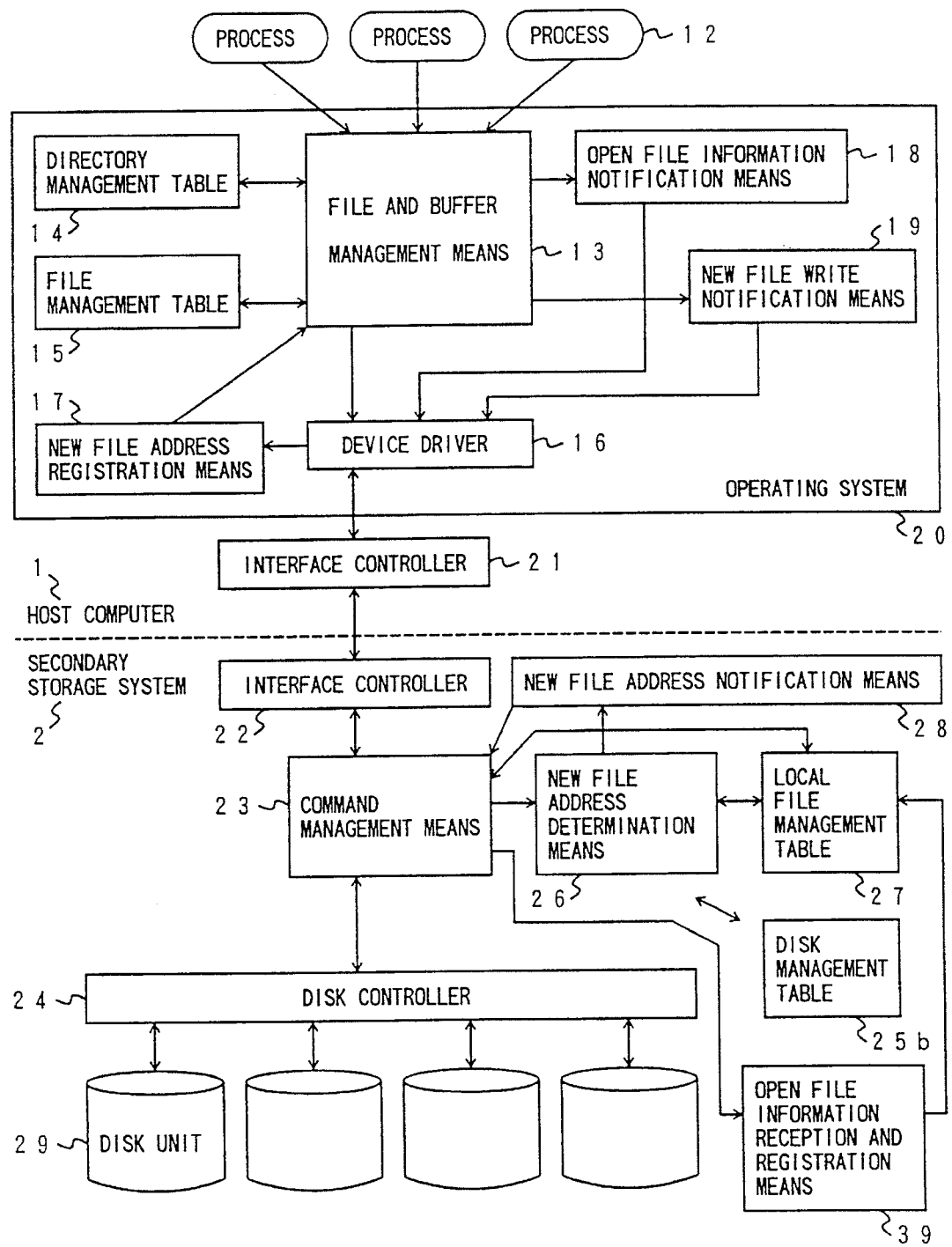
FIG. 3 is a block diagram showing the configuration of a computer system according to a first embodiment of the invention.

FIG. 3 shows the configuration of a computer system according to the first embodiment of the invention.

As shown here, the computer system according to the first embodiment comprises a host computer 1 and a secondary storage system 2.

In the host computer 1, numeral 20 denotes an OS and numeral 12 denotes a process of an application program managed by the OS 20. Application programs executed in the host computer are managed as processes 12 by the OS 20.

In the OS 20, numeral 13 indicates file and buffer management means for managing files and buffers used to transfer data when files are accessed, numeral 15 indicates a file management table for describing the correspondence between logical and local addresses of directories and files, and numeral 14 indicates a directory management table for describing directory information. Numeral 16 indicates a device driver for converting and controlling file access requests from the file and buffer management means 13 conforming to physical characteristics of various peripheral devices such as a secondary storage system; numeral 18 indicates open file information notification means for notifying the secondary storage system 2 that a file has been opened, numeral 19 indicates new file write notification means for notifying the secondary storage system 2 that a new file is to be written, and numeral 17 indicates new file address registration means for receiving the store address of a new file determined by the secondary storage system 2 and registering the new file in the file management table 15. In the host computer 1, numeral 21 indicates an interface controller for controlling communication and data transfer between the host computer 1 and the secondary storage system 2.

The file management table 15 stores file management information provided for each file. This file management information provided for each file is specified via a file management information address specified by a file identification number. In the UNIX mentioned above, the file management information is called an i-node and the file identification number is called an i-node number.

Figure 4:
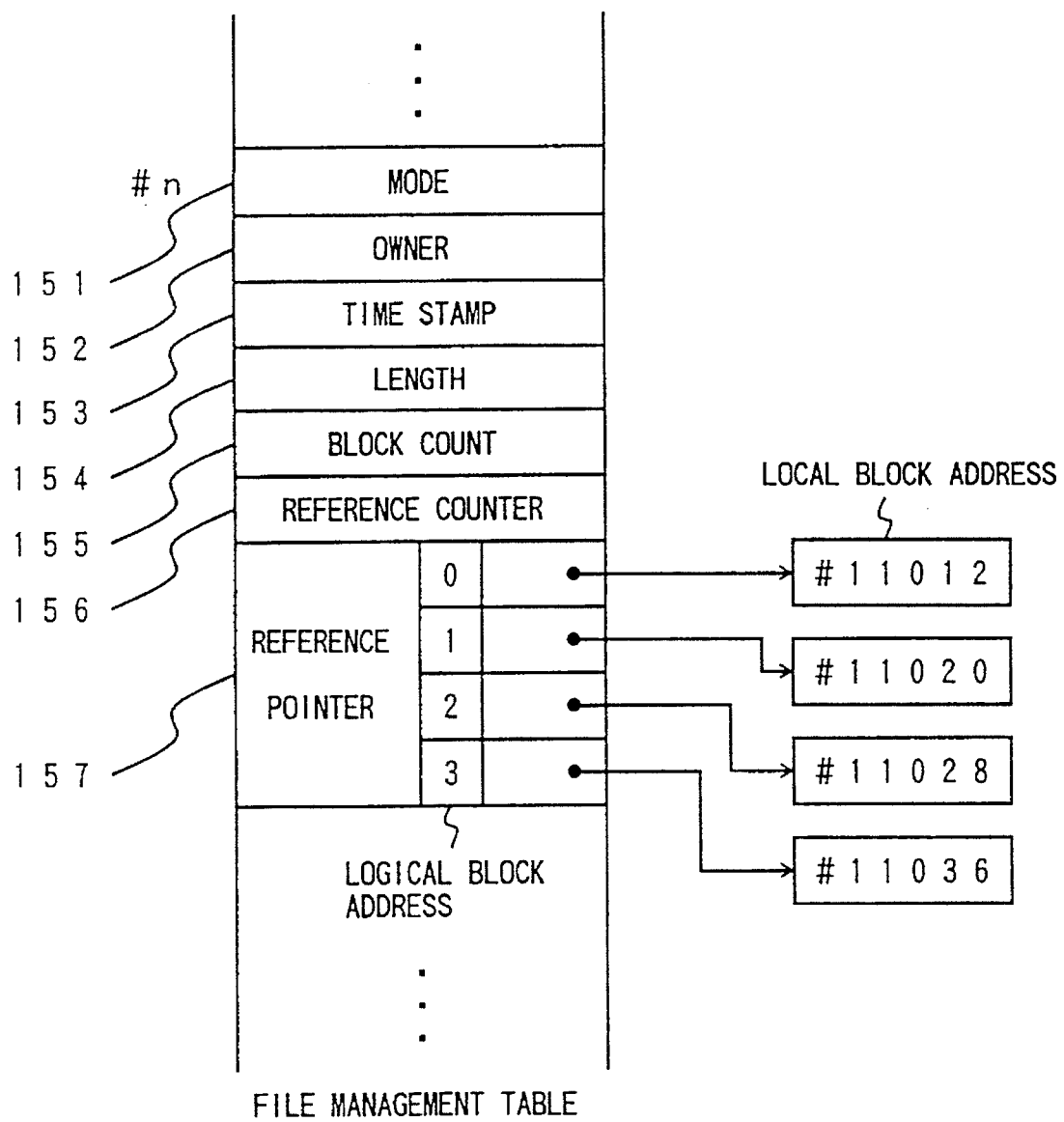
FIG. 4 is an illustration showing the format of a file management table according to the first embodiment of the invention.

The file management information consists of entries as shown in FIG. 4.

That is, the file management information has the entries of mode 151, owner 152, time stamp 153, length 154, block count 155, reference counter 156, reference pointer 157, and update flag 158 for each file.

The mode 151 stores information on the type of file and the current access mode of the file, such as read or write, and the owner 152 stores information for identifying the owner of the file or a user group having an access right to the file. The time stamp 153 stores the time at which the file was last accessed, the time at which the file management table was updated, etc. The length 154 stores the number of bytes of the file and the block count 155 stores the number of blocks of the file. The reference counter 156 stores the number of times the file has been referenced. The reference pointer 157 stores the correspondence between the logical and local addresses in the secondary storage system of each block of the file. The logical addresses of blocks are called logical block addresses and the local addresses in the secondary storage system of blocks are called local block addresses.

The directory management table 14 also stores directory management information provided for each directory. The directory management information stores the file identification numbers for specifying file management information in the file management table 15 corresponding to the files belonging to the corresponding directory and information of the numbers for specifying directory management information corresponding to the directories belonging to the corresponding directory (or pointer pointing to the directory management table location).

According to such structures of the directory management table 14 and the file management table 15, the local block addresses of the blocks making up file file5 can be found by specifying directories dir1, dir2, dir3 and file file5, as described below (refer to FIG. 2): the directory management table 14 is searched for dir1, dir2, and dir3 in order. The file identification number of the file management information corresponding to file 5 in the file management table 15 is found from the directory management information of dir3 and each of the local block addresses of the blocks making up file5 are found from the file management information of file5.

On the other hand, in the secondary storage system 2, numeral 29 indicates a disk unit; numeral 24 is a disk controller for controlling the disk units 29; numeral 23 is command management means for receiving and analyzing read and write commands from the host computer, preparing disk commands proper to the disk unit 29, and sending the commands to the disk controller 24; numeral 22 is an interface controller for controlling communication and data transfer between the host computer 1 and the secondary storage system 2; numeral 27 is a local file management table for storing file management information of the files stored on the disk units 29 in the secondary storage system 2; numeral 39 is open file information reception and registration means for receiving information indicating that a file sent by the host computer 1 has been opened and registering the file in the local file management table 27; numeral 26 is new file address determination means for receiving an instruction to write a new file sent by the host computer 1 and determining the store address of the new file; numeral 28 is new file address notification means for notifying the host computer 1 of the address determined by the new file address determination means 26; and numeral 25b is a disk management table for managing the parameters for determining the configuration of the disk units in the secondary storage system and the usage states of the disk units.

The format of the local file management table 27 and the file management information stored in the table 27 are the same as the format of the file management table 15 and the file management information stored in the table 15 in the host computer 1. The file management information of the same file is specified by the same file identification number.

Now, the file access operation in the computer system according to the first embodiment will be discussed.

First, the file and buffer management means 13 previously loads file management information stored in the local file management table 27 in the secondary storage system 2 into the file management table 15 in the host computer 1. The load operation is performed when the host computer 1 is initialized, when a new storage medium is mounted in the secondary storage system, or when file open processing described below is started.

Figure 5:
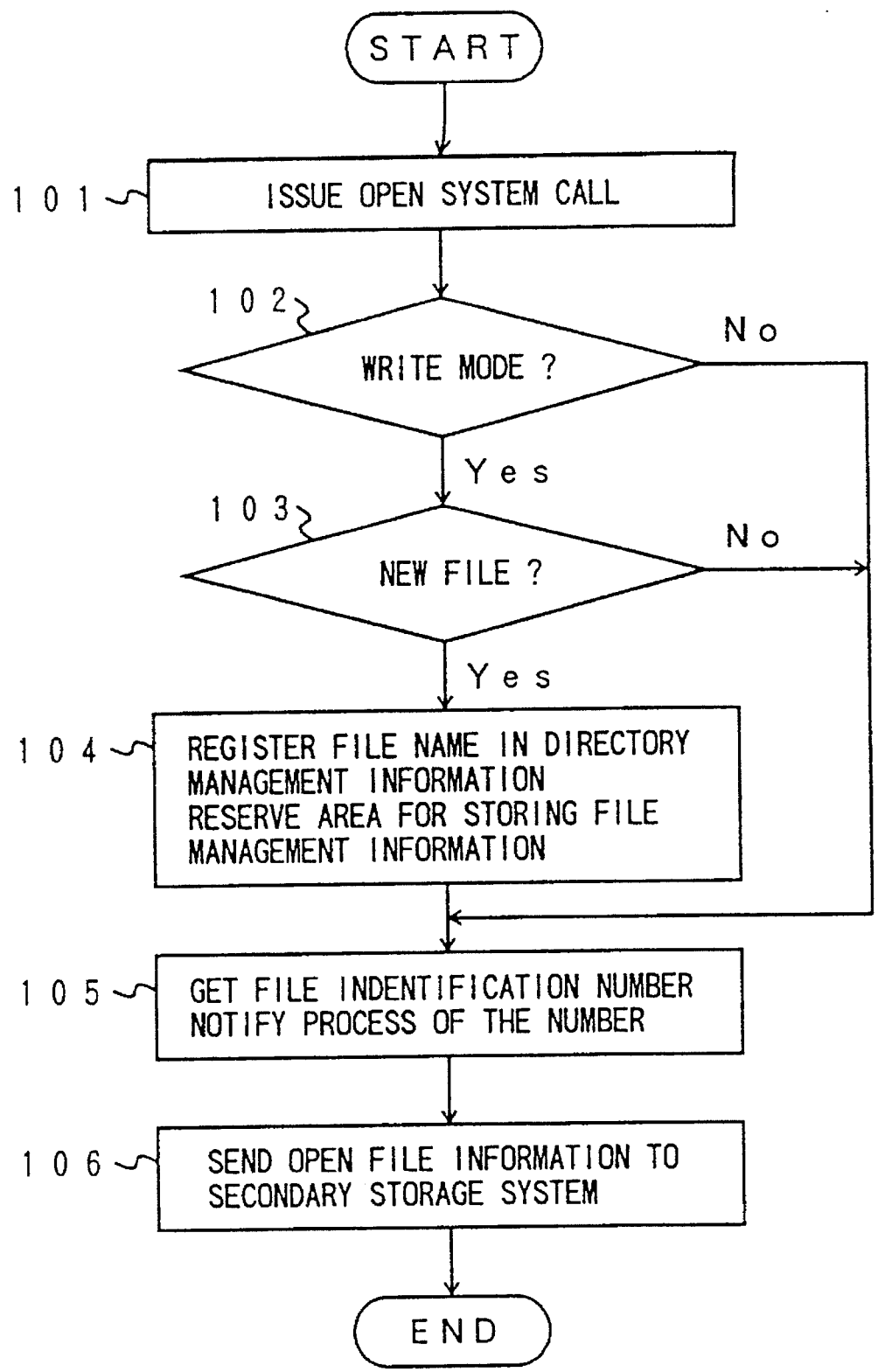
FIG. 5 is a flowchart showing a file open procedure executed by an OS according to the first embodiment of the invention.

When an open system call is issued from a process 12 of an AP, the OS 20 performs file open processing shown in FIG. 5.

As shown here, when an open system call is issued at step 101, the file and buffer management means 13 in the OS 20 analyzes the system call and determines the file access mode at step 102. If it is a write mode and a file is to be opened, the file and buffer management means 13 further determines whether or not the file is a new file at step 103. If it is a new file, the means 13 registers the file name of the file in the directory management information in the directory management table 14 corresponding to the directory in which the file is to be created, and reserves an area for storing file management information concerning the new file in the file management table 15 at step 104. Also, the file and buffer management means 13 registers the file identification number of the file management information in the directory management information in the directory management table 14 corresponding to the directory in which the file is to be created, then notifies the process 12 of the file identification number at step 105.

If the file is not new, the means 13 gets the file identification number of the file from the directory management table 14 and notifies the process 12 of the number at step 105.

Next, the file and buffer management means 13 informs the open file information notification means 18 of information such as the address and file name of the file management information specified by the file identification number proper to the file. The open file information notification means 18 transfers the information entries to the secondary storage system 2 via the device driver 16 and the interface controllers 21 and 22 at step 106.

The open file information reception and registration means 39 in the secondary storage system 2 receives the information entries, and if they concern a new file, reserves a new file management information area in the local file management table 27 and registers the received information entries in the table area.

Now, the management information on the opened file is registered in both the file management table 15 in the host computer 1 and the local file management table 27 in the secondary storage system 2.

Upon completion of the file open processing, file read or write processing is performed.

Figure 6:
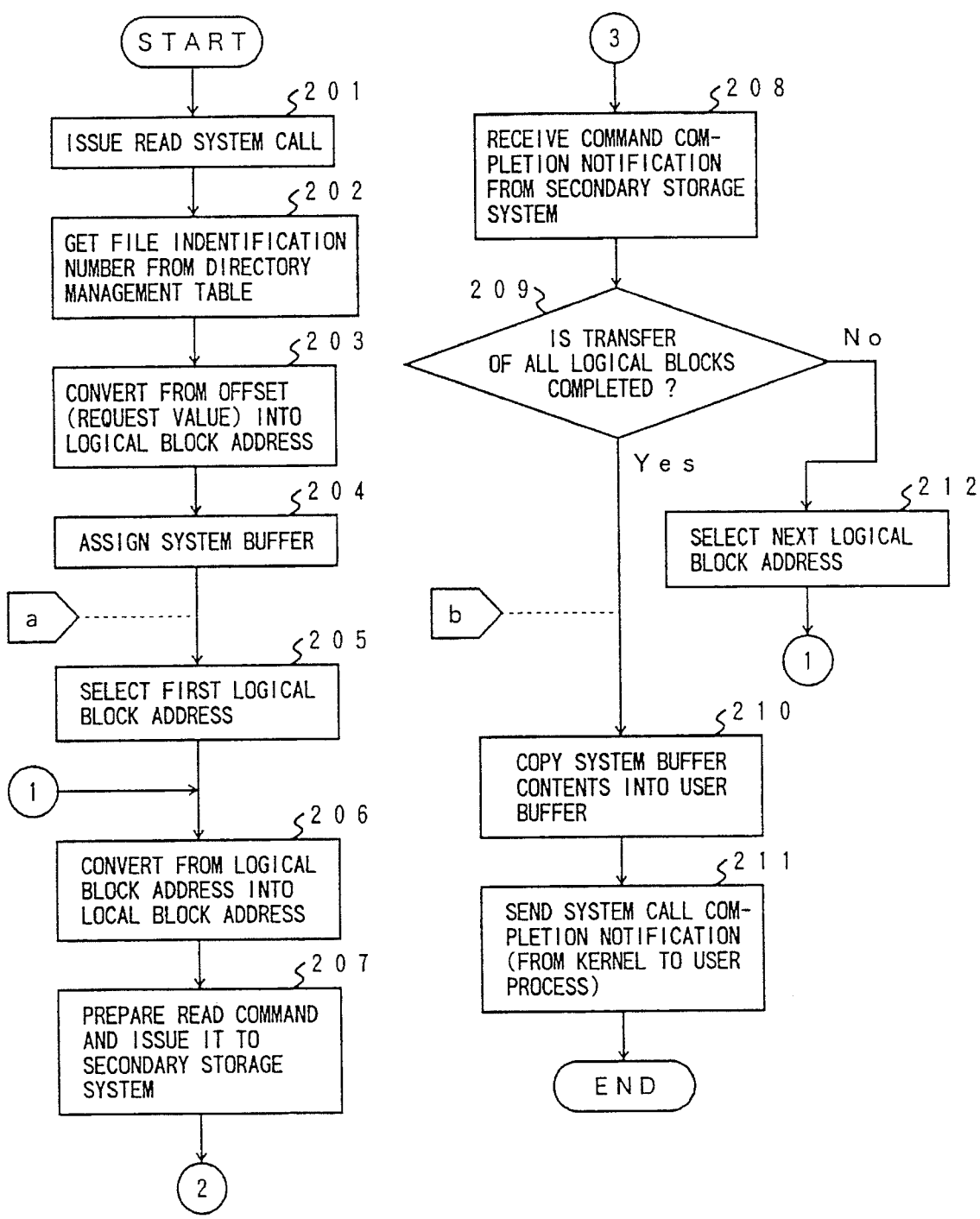
FIG. 6 is a flowchart showing a file read procedure executed by the OS according to the first embodiment of the invention.
Figure 7:
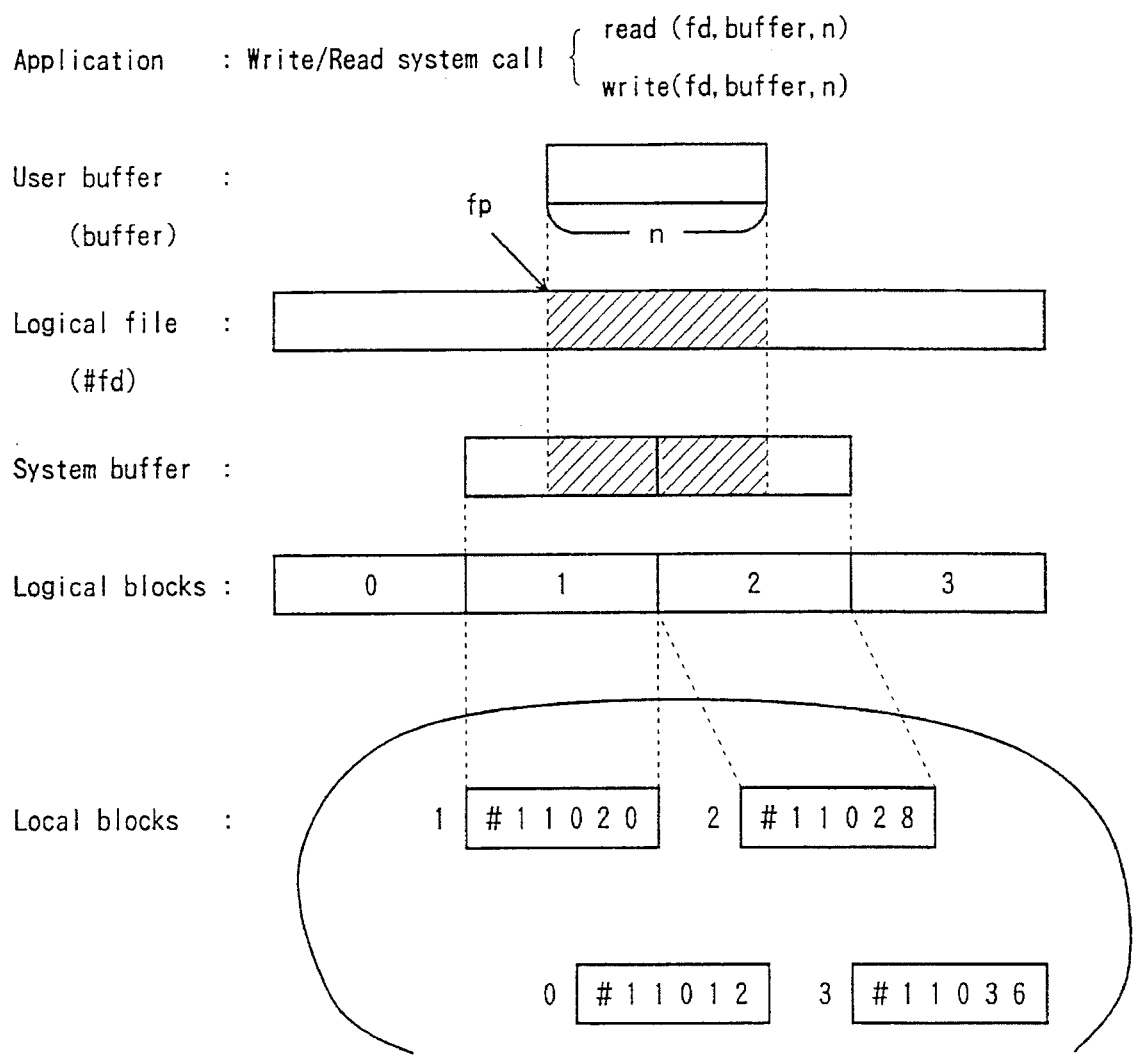
FIG. 7 is an illustration showing the relationship between accessed data and logical blocks.
Figure 8:
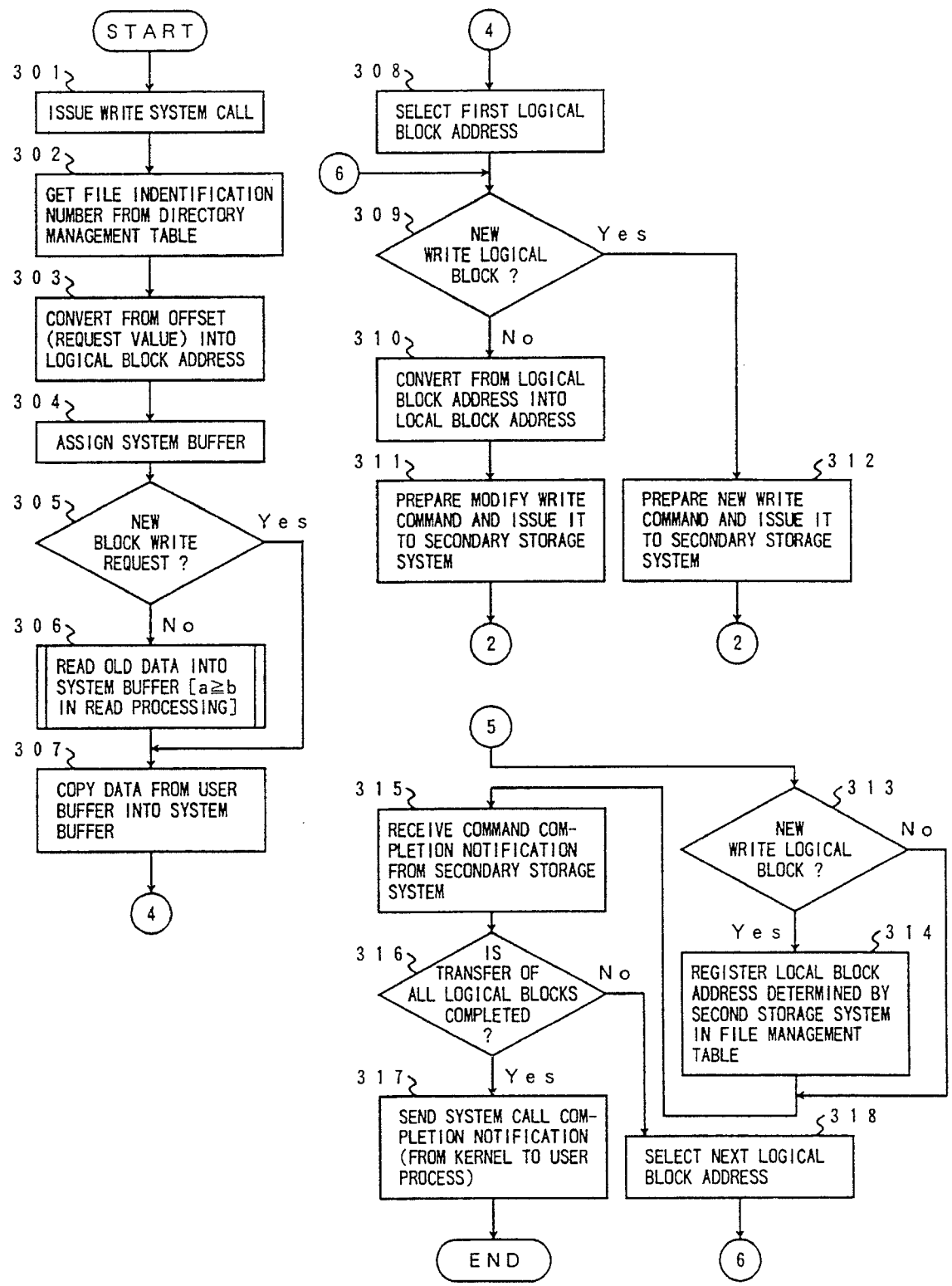
FIG. 8 is a flowchart showing a file write procedure executed by the OS according to the first embodiment of the invention.
Figure 9:
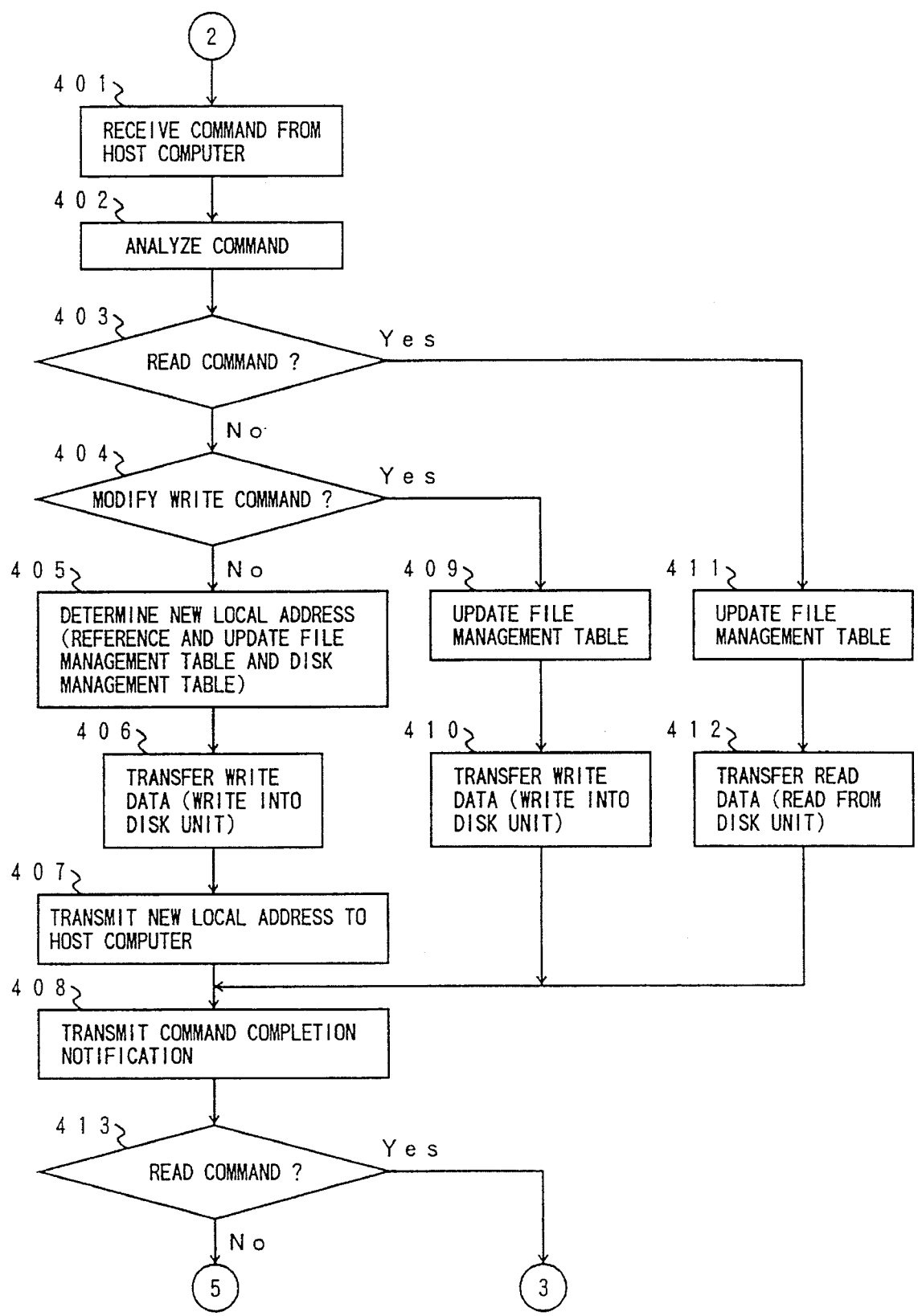
FIG. 9 is a flowchart showing file read/write procedures executed by a secondary storage system according to the first embodiment of the invention.

FIG. 6 shows a file read procedure executed by the OS 20. FIG. 7 shows the relationship between accessed data and logical blocks. FIG. 8 shows a file write procedure executed by the OS 20. FIG. 9 shows file read and write procedures executed by the secondary storage system 2.

First, the file read processing will be discussed. As shown in FIG. 6, when a file read system call (read is issued from AP (process 12) in the host computer 1 at step 201, the file and buffer management means 13 in the OS 20 references the directory management table 14 and gets the file identification number of the file indicating the location of the file management information corresponding to the file in the file management table 15 at step 202. Next, the file and buffer management means 13 obtains the file management information in the file management table 15 specified by the obtained file identification number.

The AP requests a read or write of file in byte units called an offset by issuing a file read or write system call. FIG. 7 shows an example in which the AP requests the n-byte offset starting at file pointer fp provided for file fd to be read into the user buffer. As shown here, the offset is data extending over logical block addresses 1 and 2, namely, that needs to be read from the two local blocks corresponding to the logical blocks 1 and 2 (local block addresses #11020 and #11028).

Then, the file and buffer management means 13 finds logical block addresses 1 and 2 where the requested offset data exists from the obtained file management information at step 203. The means 13 reserves a system buffer as a temporary work area required to read the two logical blocks at step 204. Next, the file and buffer management means 13 selects the first logical block address 1 at step 205, converts it into local block address #11020 at step 206, and issues a request for transferring the data block at the local block address to the device driver 16. When receiving the request, the device driver 16 prepares a read command appropriate to the secondary storage system 2 and sends the command to the secondary storage system 2 via the interface controller 21 at step 207.

The command management means 23 in the secondary storage system 2 receives the read command via the interface controller 22. The secondary storage system 2 receiving the read command first analyzes the command at step 402, as shown in FIG. 9. Since the command is found to be a read command at step 403, management information such as the access count (described below) in the local file management table 27 in the secondary storage system 2 is updated as required at step 411 and the target data is read from the disk unit 29 and is transferred to the host computer 1 via the interface controller 22 at step 412. If all requested data can be transferred normally, the command management means 23 sends a completion notification to the host computer at step 408.

The completion notification is received by the device driver of the host computer 1.

Referring back to FIG. 6, when receiving the command completion notification from the secondary storage system 2 at step 208, the device driver 16 transfers it to the file and buffer management means 13. Then, the file and buffer management means 13 checks to see if all logical blocks to be transferred have been read at step 209, and if an untransferred logical block exists, selects another logical block at step 212 and repeats the steps executed above. If transfer of data in all logical blocks to the system buffer is completed, the file and buffer management means 13 copies the offset data requested by the AP into the user buffer at step 210, returns a system call completion notification to the AP, and completes the file read processing.

Next, file write processing is discussed centering around the differences from the read processing described above.

The file write processing is roughly classified into the following two types: One is the registration process of new blocks and the other is the update process of already existing blocks. The former is executed to write a new file or append data to the end of an already existing file. The latter is executed to write data from an intermediate point of an already registered logical block or update an already existing file in units of records (define data units).

As shown in FIG. 8, when a write system call is issued from an AP at step 301, the file and buffer management means 13 in the OS 20 gets the file identification number of the target file from the directory management table 14 at step 302, finds the logical block address to be transferred from the specified offset at step 303, and reserves a necessary system buffer at step 304, as described above. Also, the means 13 references the file management table 15, and if the local block address corresponding to the logical block address is not registered, determines that the logical block is a new one at step 305.

If it is judged to be a new logical block, the file and buffer management means 13 copies write data from the user buffer into the system buffer at step 307 and selects the first logical block. On the other hand, the new file write notification means 19 generates a new block write request for writing the selected logical block. When receiving the request, the device driver 16 prepares a new block write command proper to the secondary storage system 2 and issues the command at step 312.

The file identification number and the logical block address are described in the new block write command.

As shown in FIG. 9, the issued new block write command is received at step 401 and analyzed at step 402 by the command management means 23 in the secondary storage system 2. If the command is recognized as a new block write command as a result of the analysis at step 403, 404, the command management means 23 transfers the file identification number and the logical block address to the new file address determination means 26, which then references the local file management table 27 and the disk management table 25b according to the file identification number and determines the local block address where the new block is to be stored by considering the configuration parameters, physical parameters, etc., of the disk unit 29 in the secondary storage system 2 at step 405.

Such an optimum local block address determination procedure is described below.

Next, the determined local block address together with the logical block address related thereto is registered in the local file management table 27 and a flag indicating that the local block is in use is set in the disk management table 25b.

Next, data transfer is started. The data transferred from the host computer 1 is received and written into the disk unit 29 according to the determined local address at step 406. The new file address notification means 28 transmits the determined local address to the host computer 1 at step 407. Upon completion of determination of the local block address of the new block and the data transfer, a completion notification is transmitted to the host computer 1 at step 408.

The local block address transmitted to the host computer 1 is received by the new file address registration means 15 via the interface controller 21 and the device driver 16.

Referring back to FIG. 8, when receiving the local block address via the interface controller 21 and the device driver 16 from the secondary storage system 2, the new file address registration means 15 in the host computer 1 requests the file and buffer management means 13 to register the local block address. Then, the file and buffer management means 13 registers the local block address by relating it to the corresponding logical address in the file management information of the corresponding file in the file management table 15 at step 314. When receiving the block transfer completion notification from the secondary storage system 2 at step 315, the file and buffer management means 13 terminates the write processing of the block. If all logical blocks have not been written, the next corresponding logical block is selected at step 318 and the steps described above are repeated until write processing of all logical blocks is completed.

On the other hand, if it is determined that the write block is not a new logical block at step 305, write processing into the already existing logical block is executed as follows:

This processing differs from the write processing of new logical blocks basically in that data may be updated from an intermediate point of the existing logical block and that a local block address is already mapped to the existing logical block.

To update data from an intermediate point of an existing logical block, the logical block needs to be temporarily read. That is, the block is read into the system buffer from the secondary storage system and new data is transferred from the user buffer to the system buffer for updating the block in the system buffer and then writing the block into the secondary storage system.

Thus, to write into the already existing block, first the read processing is performed at step 306, which equals the process from reference character a to b shown in FIG. 6.

Next, since local block address mapping to the existing block is already completed, when a write command is issued to the secondary storage system 2, the local block address is specified from the host computer 1. Thus, conversion from logical block address to local block address is executed at step 310, as in the read processing, then a modify write command is prepared and issued to the secondary storage system at step 311.

On the other hand, in the secondary storage system 2, the data in the transferred block is written into the specified local block address in response to the received modify write command at step 410 in FIG. 9. At this time, the management information such as the access count (described below) in the local file management table 27 in the secondary storage system 2 is updated as required at step 409.

As described above, according to the system, to store a file in the secondary storage system, the local address where the file is to be stored is determined by the secondary storage system, so that the file can be stored in the optimum location fitted to the configuration parameters and physical parameters appropriate to the secondary storage system and the file access characteristics determined by the AP characteristics in the host computer 1, producing a large effect on high-speed file operation.

Figure 24:
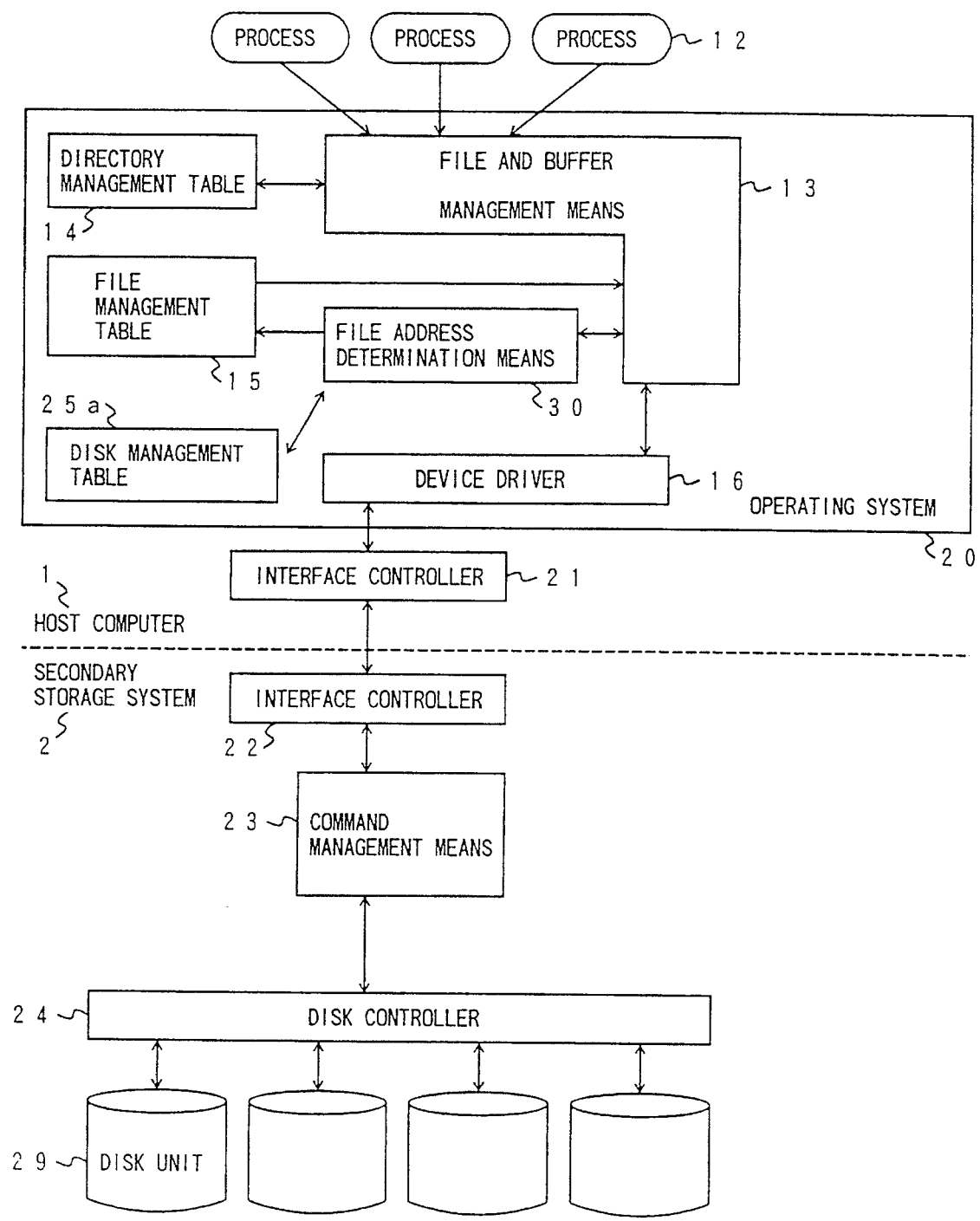
FIG. 24 is a block diagram showing the configuration of a conventional computer system.

It is noted that the conventional secondary storage system 2 having no capability of determining the local block address of a new file (see FIG. 24) as well as the secondary storage system 2 as described in the first embodiment can preferably be connected to the host computer 1. That is, preferably the host computer 1 is adapted to be compatible with conventional secondary storage system described above.

Figure 10:
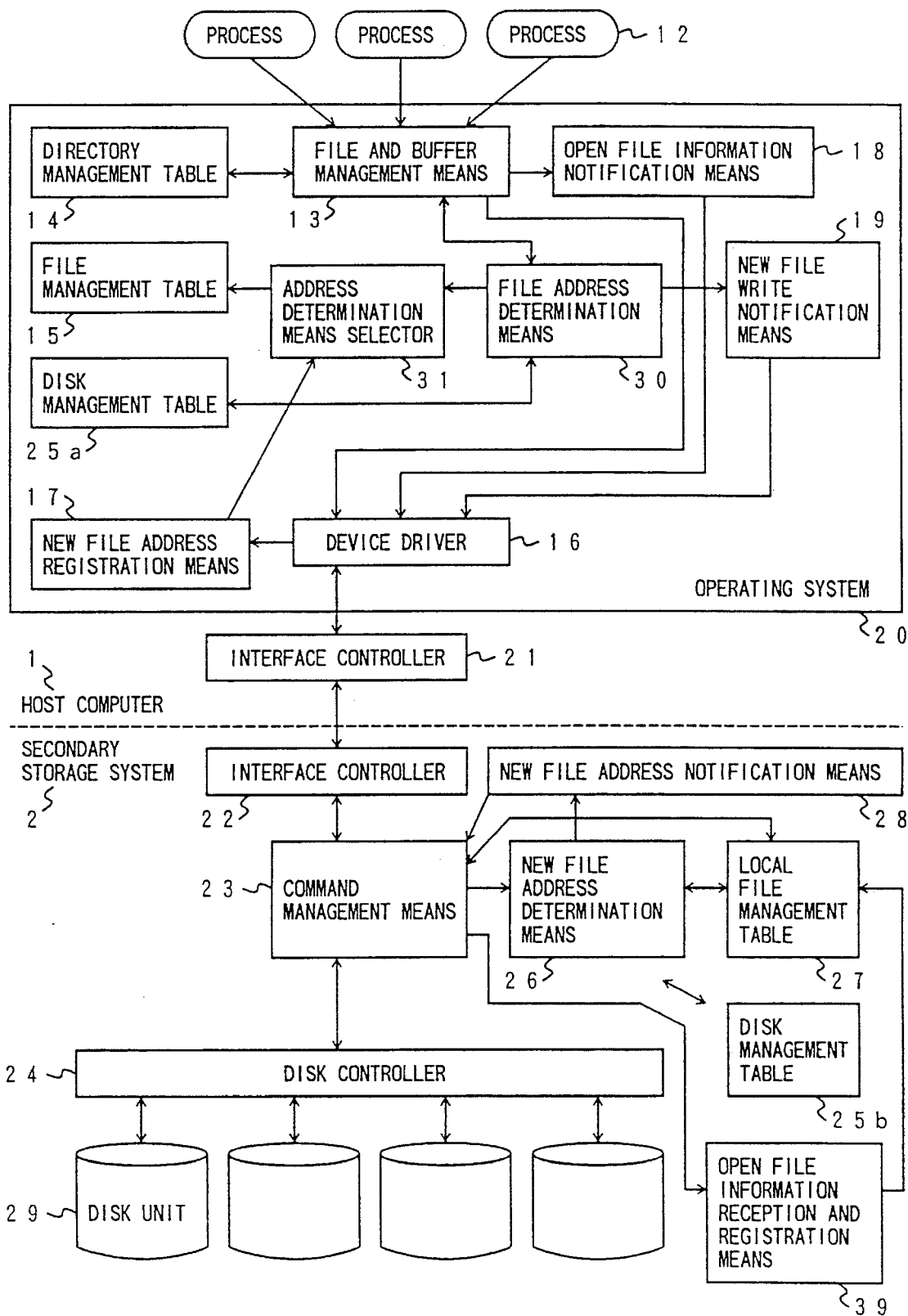
FIG. 10 is a block diagram showing the configuration of a computer system according to a second embodiment of the invention.

Now, a computer system compatible with such a conventional secondary storage system will be discussed as a second embodiment of the invention. FIG. 10 shows the configuration of the computer system according to the second embodiment.

The computer system according to the second embodiment is provided by adding a disk management table 25a, file address determination means 30, and an address determination means selector 31 for selecting the file address determination means 30 or new file address determination means 26 for use to the computer system according to the first embodiment.

The disk management table 25a is provided to manage the disk usage states. The file address determination means 30 determines the local block address of the optimum disk unit to write a new logical block.

Next, the operation of the computer system according to the second embodiment is discussed.

First, when the system is initialized, the file and buffer management means 13 in the host computer 1 negotiates with the command management means 23 in the secondary management system 2 via the device driver 16 for determining whether or not the secondary storage system 2 has the capability of determining the local block address of a new file, and sends the determination result to the address determination means selector 31.

If the secondary storage system 2 has the capability of determining the local block address of a new file, the address determination means selector 31 invalidates the file address determination means 30 and the disk management table 25a in the host computer 1. After this, the same operation as in the first embodiment is performed.

On the other hand, if the secondary storage system 2 has no capability of determining the local block address of a new file, the address determination means selector 31 invalidates the open file information notification means 18 and the new file write notification means 19 and the operation as in the conventional computer system described above is performed.

Further, to connect a plurality of secondary storage systems at the same time for use, each time an AP makes a request for accessing one of the secondary storage systems, whether or not the specified secondary storage system has the capability of determining the local block address of a new file is determined and either a pair of the open file information notification means 18 and new file write notification means 19 or a pair of the file address determination means 30 and disk management table 25a is invalidated in response to the determination result. Then, the operation as in the first embodiment or the conventional computer system is performed.

Even if the secondary storage system 2 has the capability of determining the local block address of a new file, the operation as in the conventional computer system can be performed by invalidating the new file address determination means 26, new file address notification means, etc., in the secondary storage system 2 as well as the open file information notification means 18 and the new file write notification means 19.

Thus, according to the second embodiment, the conventional secondary storage system can also be used in the computer system according to the first embodiment. Two or more secondary storage systems can be connected or a new secondary storage system can be added to the secondary storage system traditionally used, enhancing flexibility and expandability of the computer system configuration.

Next, a third embodiment of the invention will be discussed.

In the third embodiment, unlike the first embodiment, a host computer 1 does not manage any local block addresses of files.

Figure 11:
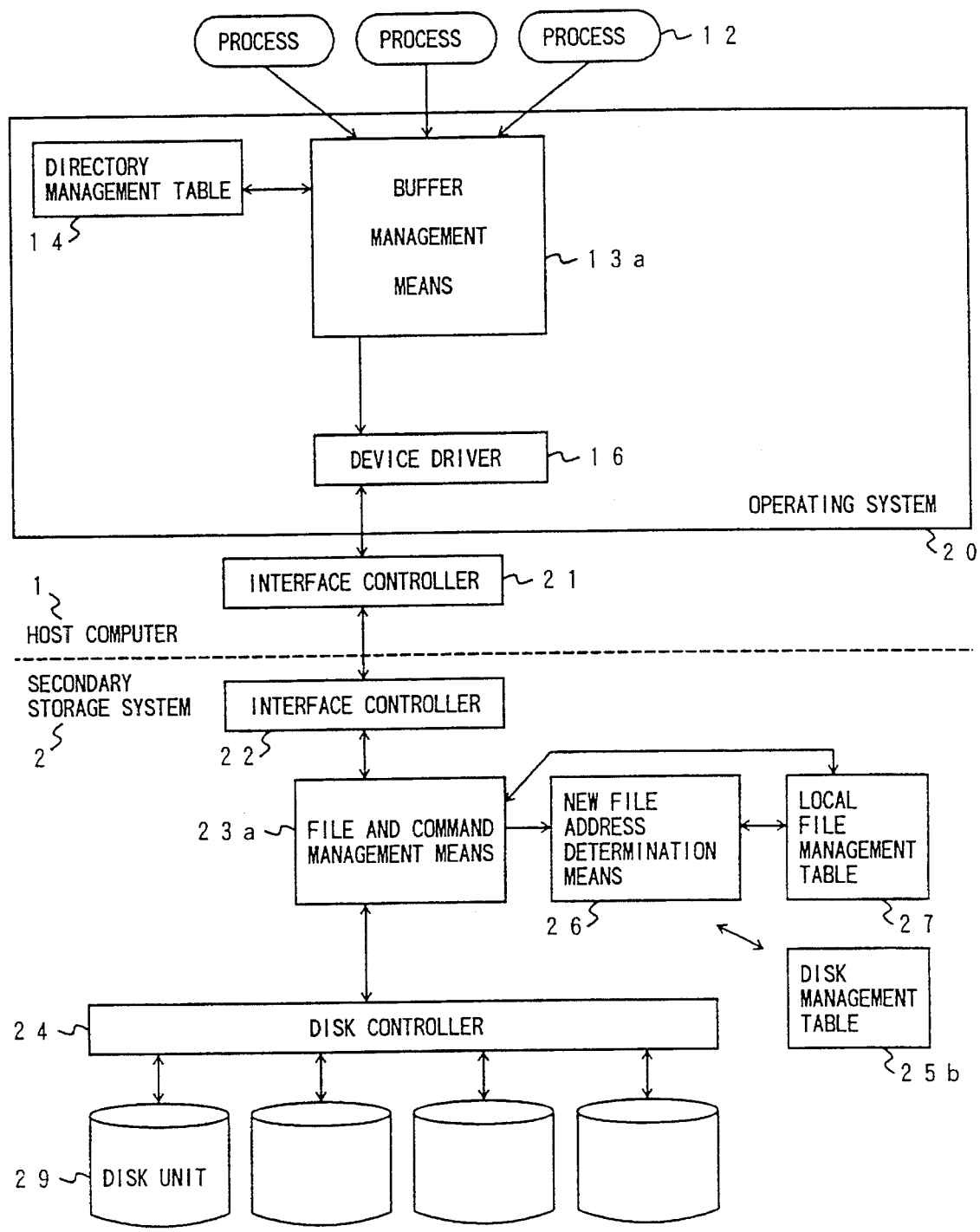
FIG. 11 is a block diagram showing the configuration of a computer system according to a third embodiment of the invention.

FIG. 11 shows the configuration of a computer system according to the third embodiment.

As shown here, the host computer 1 comprises a directory management table 14 for managing directories, file names, and file identification numbers, buffer management means 13a for managing buffers used for data transfer, a device driver 16, and an interface controller 21.

A secondary storage system 2 comprises an interface controller 22, file and command management means 23a for managing files and commands, new address determination means 26 for mapping local block addresses into logical blocks of new files, local file management table 27 for registering file management information, a disk management table 25b for managing the disk usage states and describing configuration parameters and physical parameters of disk units 29, a disk controller 24, and a plurality of disk units.

The host computer 1 and the secondary storage system 2 support commands for the host computer 1 to notify the secondary storage system 2 of file open and to request transfer of specified data in a given file together with the file identification number of the file. Data can be transferred between the host computer 1 and the secondary storage system 2 in the mode matching the request (block or byte unit transfer). Such data transfer and command transfer are controlled by the interface controllers 21 and 22.

Now, the operation of the computer system according to the third embodiment will be discussed.

A process 12 issues a system call such as file open or file read or write to an OS 20. When the OS 20 receives the system call, the buffer management means 13a reserves a buffer required for data transfer and prepares an open or read or write command and issues it to the secondary storage system 2 via the device driver. The command contains an offset contained in the system call. To issue the command, the buffer management means 13a references the directory management table 14 to get the file identification number of the file and transmits it together with the command to the secondary storage system 2. When an unregistered file is opened, a new file identification number is assigned to the file and the assigned file identification number together with the command is transmitted to the secondary storage system 2.

In the secondary storage system 2, the file and command management means 23a receives and analyzes the command, and if the command is a command for requesting registration of a new logical block, requests the new file address determination means 26 to determine the store address of the new logical block. The new file address determination means 26 references the disk management table 25b and the local file management table 27, and considers the configuration parameters and physical parameters of the disk unit 29, the access characteristics of the AP, etc., to determine the local block address where the new logical block is to be stored, then registers it in the local file management table 27. Determination of the local block address is described in detail below.

If the analyzed command is a command for requesting a read or write of an already existing logical block, the file and command management means 23a references the local file management table 27 to find the local block address of the logical block to be accessed, and accesses the data specified by the physical block address and the offset contained in the command. In response to the read command, the read data is transferred to the host computer 1; in response to the write command, the data transferred from the host computer 1 is written. The data transfer between the host computer 1 and the secondary storage system 2 is executed in units requested by the AP.

Thus, according to the third embodiment, the host computer need not consider the configuration, physical characteristics, etc., of the secondary storage system, and needs only to manage the file names and file identification numbers of files. Therefore, various secondary storage systems and other peripheral devices can be connected to the host computer for use.

Next, a fourth embodiment of the invention is discussed.

Figure 12:
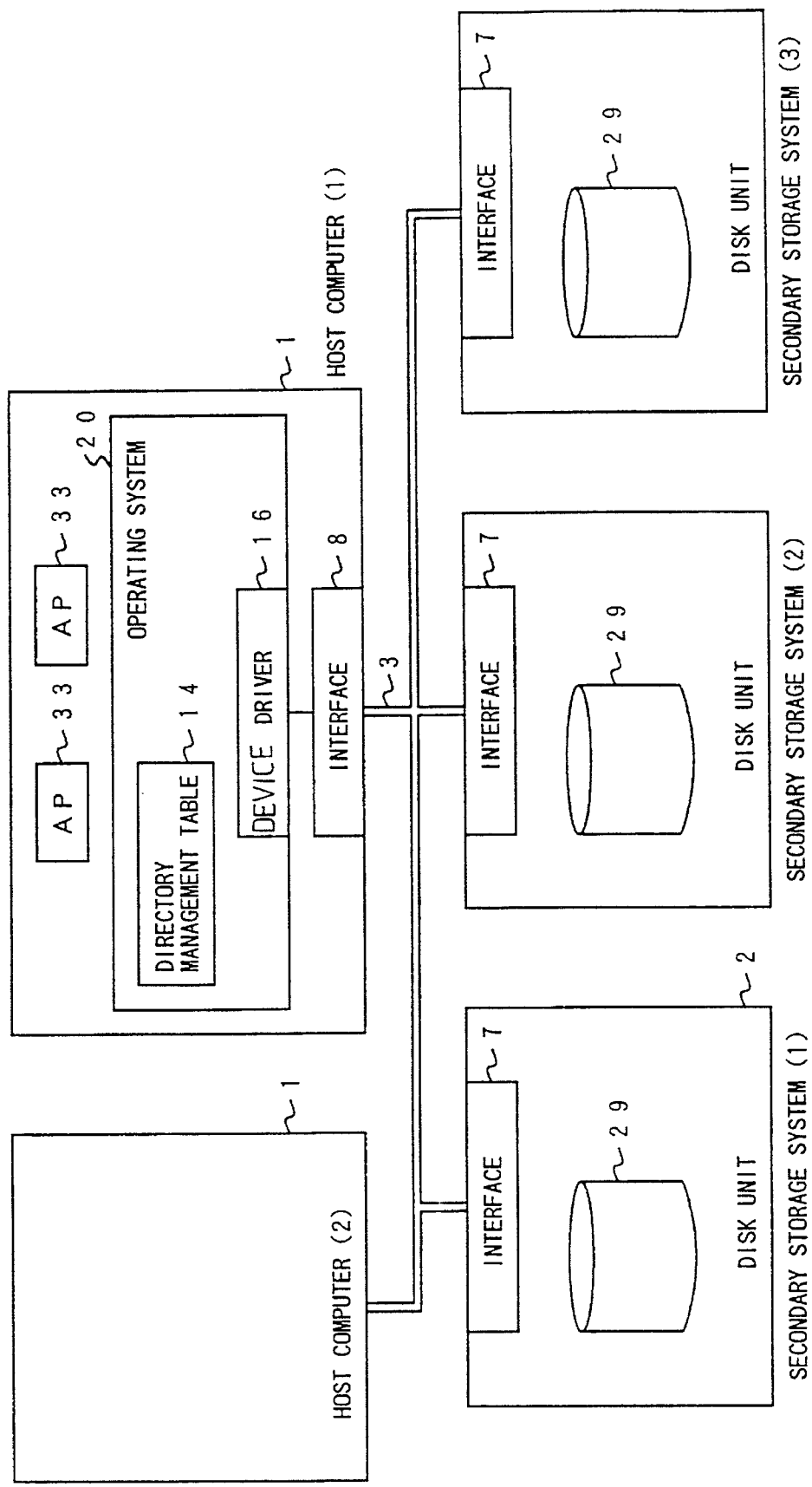
FIG. 12 is a block diagram showing the configuration of a computer system according to a fourth embodiment of the invention.

FIG. 12 shows the configuration of a computer system according to the fourth embodiment.

The computer system according to the fourth embodiment is provided by connecting a plurality of host computers 1 and secondary storage systems 2 according to the third embodiment.

The host computers 1 and secondary storage systems 2 are connected by a common interface, such as a bus-type interface known as a SCSI bus.

The operation of the computer system according to the fourth embodiment is almost the same as that in the third embodiment except that each host computer I manages the secondary storage systems storing files because file management information is distributed to the secondary storage systems. To accomplish the operation, each host computer 1 can obtain information on the stored files from each secondary storage system on a proper occasion. The secondary storage systems supervise and arbitrate duplicate assignment of a file identification number to new files so as for different host computers not to assign the same file identification number to different files in a single secondary storage system. To accomplish the operation, the secondary storage system can request the host computer to again assign a file identification number if duplicate assignment of file identification number occurs when the host computer makes a request for opening a new file, for example.

Figure 13:
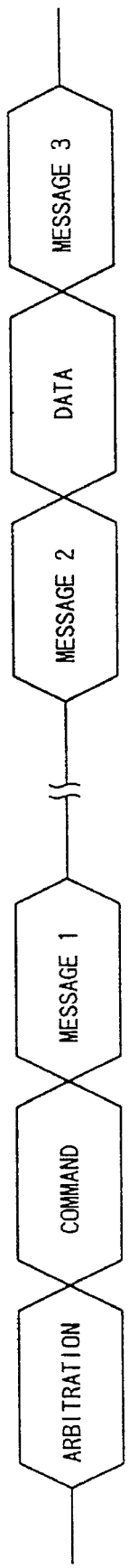
FIG. 13 is a timing chart showing a transfer sequence between a host computer and secondary storage system according to the fourth embodiment of the invention.

A sequence of transfer of commands and data via the bus is executed as shown in FIG. 13, for example. First, arbitration is executed for logically connecting a specific host computer 1 and a specific secondary storage system 2, and a command is transferred from the host computer 1 to the secondary storage system 2. Next, to release the bus to another device during the preprocessing period for the command in the secondary storage system, such as disk unit seek period, the host computer transmits message 1 for temporarily releasing the bus. Upon completion of the preprocessing, the secondary storage system 2 transmits message 2 for again connecting the host computer and the bus. Next, read/write data is transferred between the host computer 1 and the secondary storage system 2. Last, message 3 indicating the normal or abnormal termination of the command is sent from the secondary storage system to the host computer for releasing the bus.

Such a bus can also be used in the first and second embodiments. To use the bus in the first or second embodiment, message 3, also containing the local block address where a new logical block is stored, is transferred from the secondary storage system 2 to the host computer 1.

Thus, according to the fourth embodiment, each host computer 1 needs to hold only information of file names and file identification numbers of files and identification of the secondary storage systems storing the files, so that a plurality of host computers and second storage systems can be connected easily. Since file management information is held only in the secondary storage system storing the file corresponding to the file management information, the secondary storage systems can easily maintain coherency of files for a plurality of host computers.

Now, the determination procedure of the local block addresses of logical blocks of files in the secondary storage system described above will be discussed in detail.

The procedure described below can be applied to any of the first to fourth embodiments.

In FIG. 14, numeral 24 is a disk controller and numeral 36 is a group of disk units. The disk controller 24 controls the disk unit group 36 as a RAID5 type disk array. The RAID5 type disk array is disk array architecture intended for a high-speed disk access and high reliability, wherein data is divided into units called stripes for distribution to the disk units, as shown in FIG. 14. This enables the disk units to be operated completely separately in an access in stripe units for providing transaction performance as many times as the number of disk units.

Further, data stripes located side by side, for example, $D_{00}$, $D_{01}$, $D_{02}$, make up a parity group. The data in the parity group are exclusive-ORed together to provide parity, for example, $P_0$, which is then stored in one of the disk units. The parity stripes are placed in different disk units for each parity group, whereby if one disk unit should fail, the parity can be used to restore the data on the failed disk.

To optimize placement of logical blocks in such a RAID5 type disk array, configuration parameters such as the stripe size, the number of disk units, and parity placement system are required. However, these parameters vary depending on the type of secondary storage system, thus it is difficult to manage them at a host computer.

On the other hand, if the parameters are not considered, when the stripe size is made the same as the logical block size, for example, a logical block is not exactly placed in the top of one stripe, namely, on the stripe boundary and extends over two stripes. In this case, to access one logical block, two stripes, namely, two disk units need to be accessed at the same time, lowering performance remarkably.

Thus, in the invention, the secondary storage system 2 determines placement of logical blocks based on configuration parameters of its own. Described below is a problem introduced by placing logical blocks without considering the configuration parameters and placement of logical blocks executed by the secondary storage system 2 based on the configuration parameters of its own to avoid the problem.

Figure 15A:
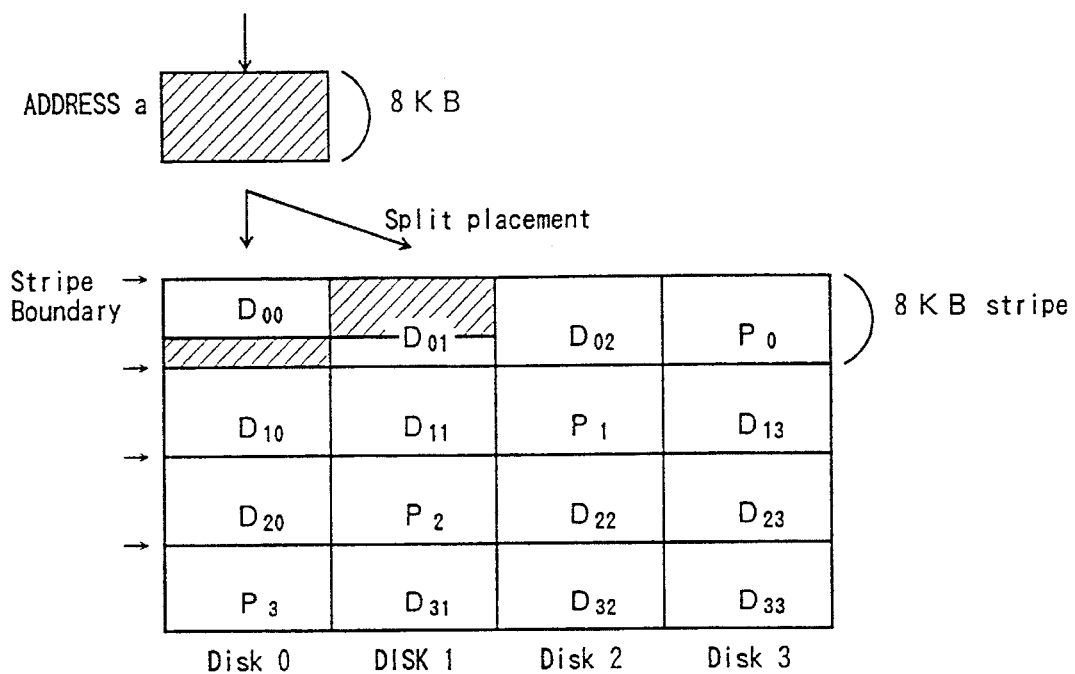
FIGS. 15a–15b are illustrations showing how to assign local addresses to logical blocks.
Figure 15B:
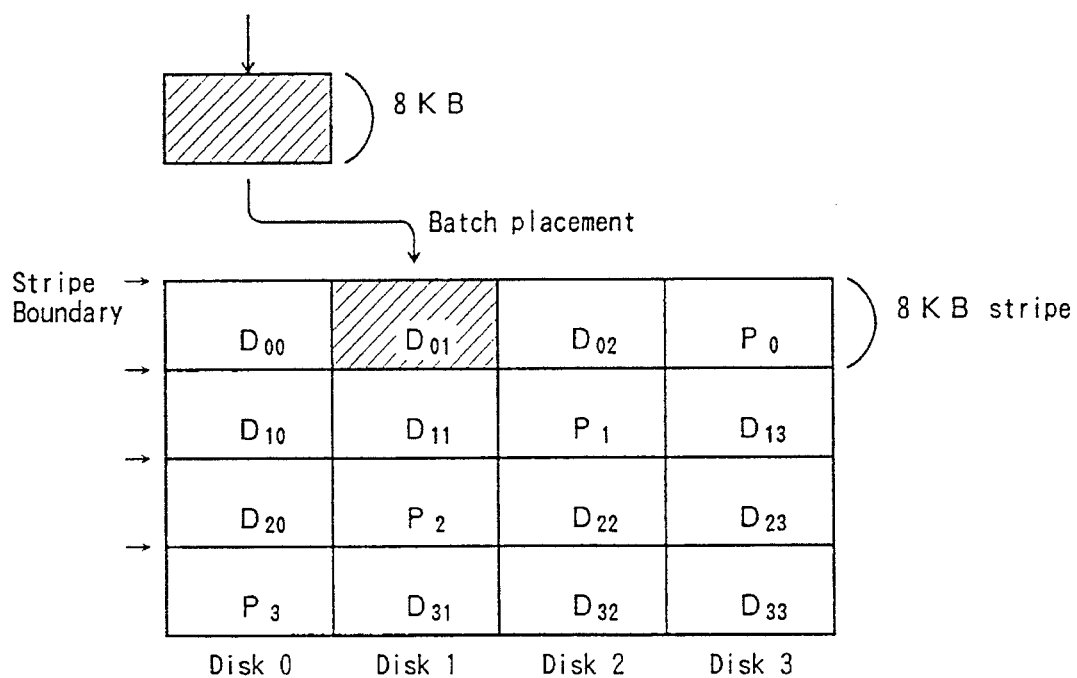

A first example is given in conjunction with FIGS. 15a and 15b.

FIG. 15a shows a case where data is stored using the two stripes $D_{00}$ stripe on disk 0 and $D_{01}$ stripe on disk 1 because logical block placement is determined without considering the stripe boundaries. In this case, two disk units are used in response to one host computer request and the two disks disks 2 and 3 can be used to handle another request concurrently with handling that request.

Then, the secondary storage system of the invention determines placement so as to fit the top of a logical block transferred from the host computer to the stripe boundary based on the configuration parameters of its own for storing data only in D01 stripe on disk 1 as shown in FIG. 15b. In this example, if the host computer issues a request for writing a new logical block with 8KB fixed, a maximum of four requests can be handled at the same thus improving throughput.

Figure 16A:
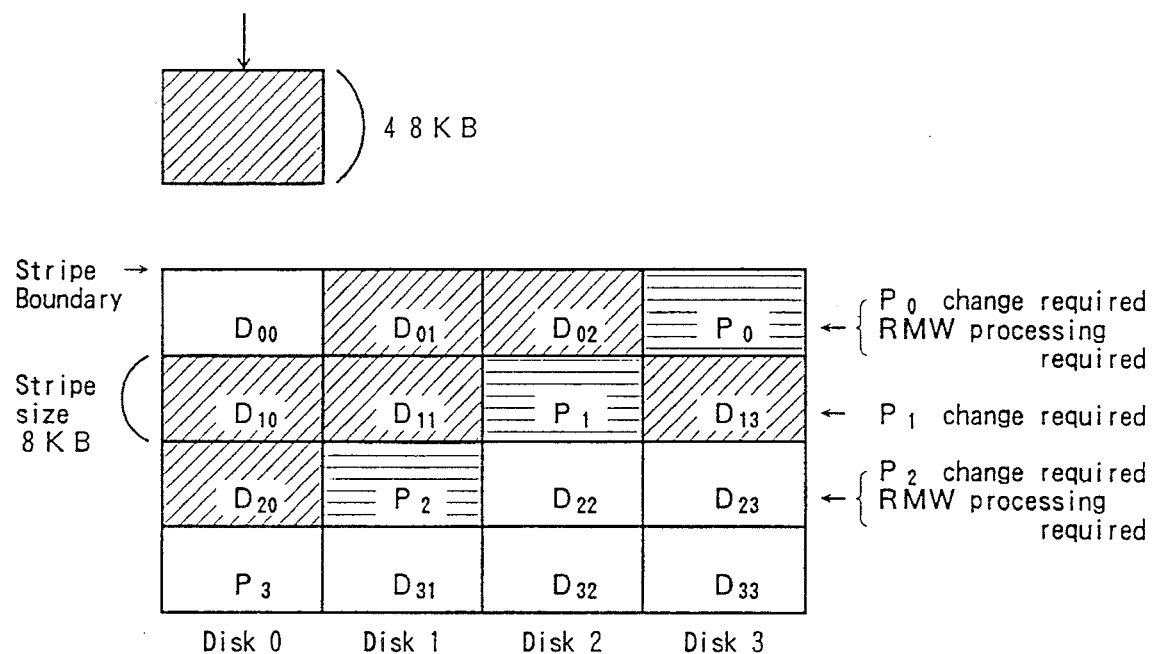
FIGS. 16a–16b are illustrations showing how to assign local addresses to logical blocks.
Figure 16B:
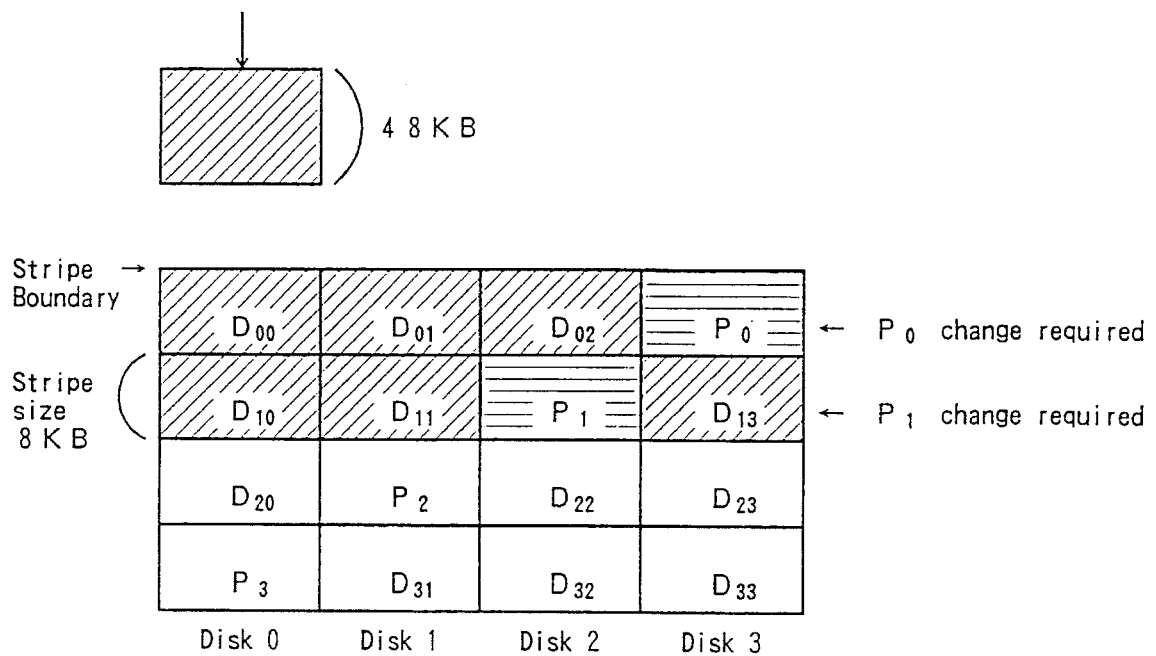

Next, a second example is given in conjunction with FIGS. 16a and 16b.

FIG. 16a shows placing a new logical block of 48KB by considering only the stripe boundaries. In the RAID5 type disk array, parity needs to be generated. The required parity is $P_0$, $P_1$, and $P_2$, which can be generated according to the following generating expressions where * is assumed to represent exclusive-OR:

$$P_0 New = (D_{01} Old * D_{02} Old) * (D_{01} New * D_{02} New) * P_0 Old$$

$$P_1 New = D_{10} New * D_{11} New * D_{31} New$$

$$P_2 New = D_{20} Old * D_{20} New * P_2 Old$$

where data with subscript Old, such as $D_{01}Old$, $D_{02}Old$, and $P_0Old$, is data already written on disk, and data with subscript New, such as $D_{01}New$ and $D_{02}New$, is data ready to be written. Therefore, to generate $P_0$, $D_{01}Old$, $D_{02}Old$, and $P_0Old$ need to be read from disks 1, 2, and 3 before $D_{01}New$ and $D_{02}New$ are written; to generate $P_2$, $D_{20}Old$ and $P_2Old$ need to be read from disks 0 and 1 before $D_{20}New$ is written. The read before write (read modify write (RMW) processing) will take a long processing time.

Then, the secondary storage system of the invention determines placement according to the following procedure based on the configuration parameters of its own:

The new file address determination means 26 references the local file management table 27 to determine a rough address. When a logical block is appended to a file, the rough address is the address where the file is stored; if a logical block of a new file is stored, the rough address is the address of the current disk area being used. The reason why the rough address of a new logical block is thus selected is that the time required for a head move on disk would probably be lessened by placing data supposed to be associated with the data in the current disk area being used near the data in the current disk area being used.

If the rough address is determined, then the new file address determination means 26 references the disk management table 25 to determine a detailed address.

A 48-KB or 6-stripe area in which the new logical block can be placed starting at a stripe on disk 0 near the rough address is determined as detailed addresses to store the new file. In the example, the fact that the six contiguous data stripes, except parity stripes from stripe #n on disk 0 to stripe #n+1 on disk 3, are unused can be known by referencing a stripe management table.

The disk management table 25 consists of the above-mentioned stripe management table and a sector management table, as shown in FIG. 17.

The stripe management table 1700 has entries, each provided for each stripe, indicating that the stripe is a data or parity stripe and is used, unused, or partially used, from which the fact that each stripe is a data or parity stripe and is partially or wholly used or unused can be known for each disk. The sector management table 1710 is provided to manage the sector use state for each stripe on each disk. The sector management table 1710 shown in FIG. 17 is one used when the stripe size is 8KB, in which case one stripe consists of sixteen 512-B sectors. Whether each sector is used or unused can be determined from such format of the table.

For example, it indicates that stripe #n+2 on disk #0 (circled in FIG. 17) has attribute "010," which denotes a partially used data stripe. Then, when the entries in the sector management table corresponding to the stripe are referenced, the fact that sectors No. 0 to 7 in the stripe are used and that sectors No. 8 to 15 are unused is known. From this fact, it is determined that the new logical block transferred from the host computer should be stored in the contiguous area of $D_{00}$–$D_{13}$ as shown in FIG. 16*b*.

Further, in this case, the parity stripes to be generated are two of $P_0$ and $P_1$, which are generated by the following generating expressions:

$$P_0 New = D_{00} New * D_{01} New * D_{02} New$$

$$P_1 New = D_{10} New * D_{11} New * D_{13} New$$

These generating expressions enable parity to be found without executing a read of data before a write.

Assume that RMW processing takes 1.7 times as long as Write processing on average. As compared with the storage as shown in FIG. 16*a*, the new logical block is stored at a 2.2 times faster speed because the RMW processing becomes unnecessary.

Thus, according to the invention, in the secondary storage system, optimum file storage can be accomplished considering the data transfer length and positional relationship with other associated files for the parameters such as the stripe size, the number of disks, and parity placement system in a RAID type disk array.

An example of optimum logical block placement in the RAID5 type disk array has been given. If disk units of any configuration are used, optimum logical block placement can be carried out matching the configuration parameters, physical characteristics, logical block size, and AP access characteristics. Likewise, optimum placement can also be accomplished for disk units other than disk arrays, optical disks, tape devices, semiconductor storage systems, etc.

Next, a fifth embodiment of the invention will be discussed.

The fifth embodiment relates to a secondary storage system 2 that can be used with the computer systems according to the first to fourth embodiments.

The secondary storage system 2 according to the fifth embodiment differs from the secondary storage system shown in the first embodiment (see FIG. 3) mainly in that the storage system 2 comprises a plurality of disk unit groups.

Figure 18:
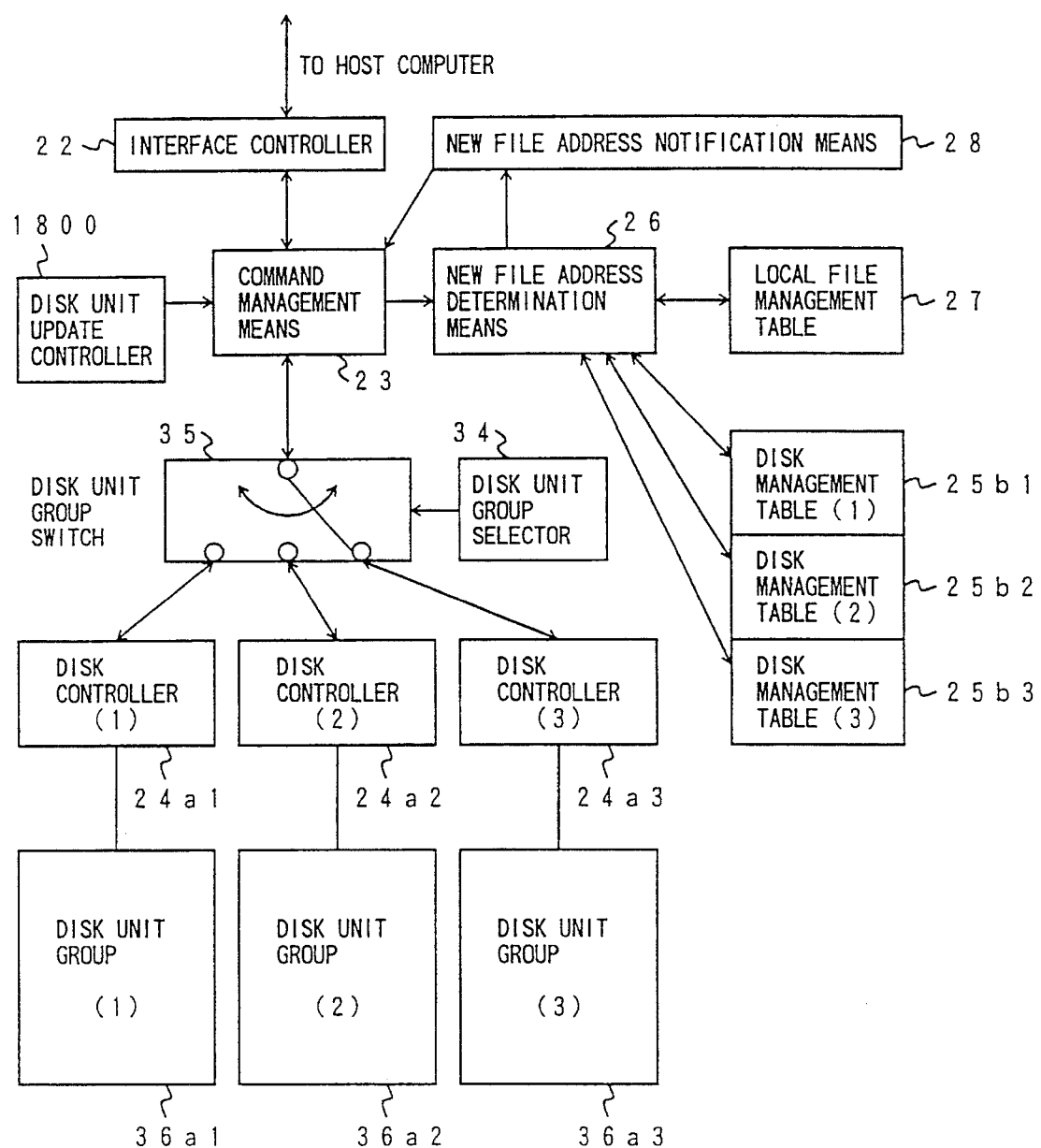
FIG. 18 is a block diagram showing the configuration of a secondary storage system according to a fifth embodiment of the invention.

FIG. 18 shows the configuration of the secondary storage system according to the fifth embodiment.

In the figure, numerals 36*a*1, 36*a*2, and 36*a*3 are disk unit groups, numerals 24*a*1, 24*a*2, and 24*a*3 are disk controllers for controlling the disk unit groups respectively, numeral 34 is a disk unit group selector for selecting one of the disk unit groups for use, numeral 35 is a disk unit group switch for switching the disk unit groups, numerals 25*b*1, 25*b*2, and 25*b*3 are disk management tables for managing the configuration parameters, physical characteristics, and use state of the disk unit groups, and numeral 1800 is a disk unit group update controller. Members identical with those previously described with reference to FIG. 3 are denoted by the same reference numerals in FIG. 18 and therefore will not be discussed again.

Now, the operation of the secondary storage system according to the fifth embodiment of the invention will be outlined.

The command management means 23 in the second storage system 2 receives an access request from the host computer 1, and if the request is one for writing a new logical block, transfers it to the new file address determination means 26, which then references the local file management table 27 and the disk management tables 25*b*1, 25*b*2, and 25*b*3 to select an appropriate disk unit group and maps a local block address, then transfers it to the disk unit group selector 34, which then handles the disk unit group switch 35 to choose the selected disk unit group. The subsequent process is executed as in the first embodiment.

The new file address determination means 26 considers the transfer length, access frequency characteristic of the file itself, disk unit group characteristics, etc., for selecting the disk unit group. Detailed examples are given below.

Figure 19:
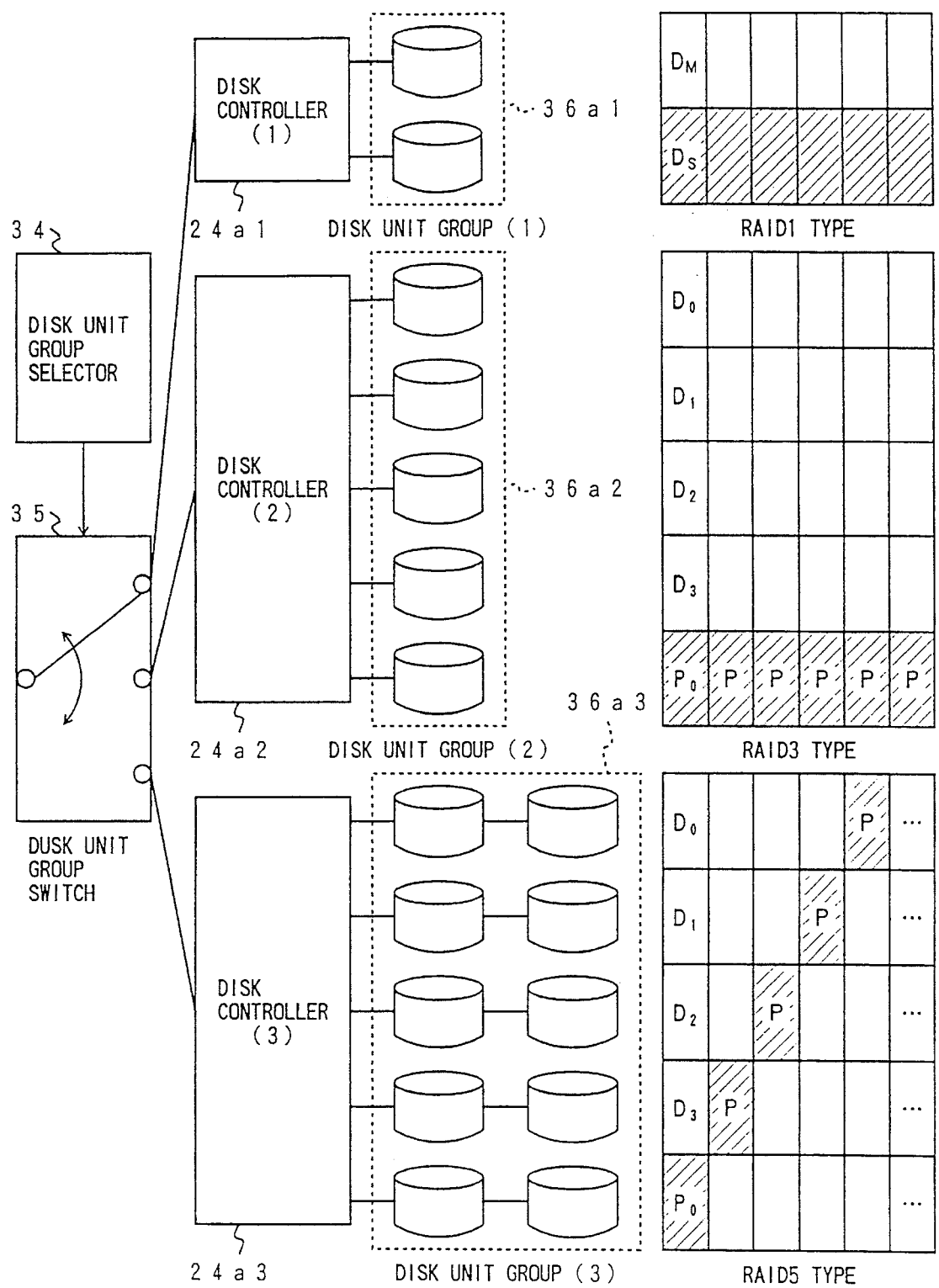
FIG. 19 is a block diagram showing a first specific configuration example of the secondary storage system according to the fifth embodiment of the invention.

Specifically, the disk unit groups according to the fifth embodiment can be configured as shown in FIG. 19, for example.

In the example shown in FIG. 19, the disk unit group 1 is a RAID1 type disk array system (or mirror disk system), the disk unit group 2 is a RAID3 type disk array system, and the disk unit group 3 is a RAID5 type disk array system.

In the example, files frequently accessed and files requiring high performance should be stored in the disk unit group 1 of the RAID1 type, mass sequential files such as image data should be stored in the disk unit group 2 of the RAID3 type, and random files for transaction such as a data base access should be stored in the disk unit group 3 of the RAID5 type.

Then, the new file address determination means 26 selects one of the disk unit groups as follows:

First, if a command from the host computer 1 is a request for updating an already existing logical block of an existing file, the new file address determination means 26 selects the disk unit group in which the existing logical block is stored.

Figure 20:
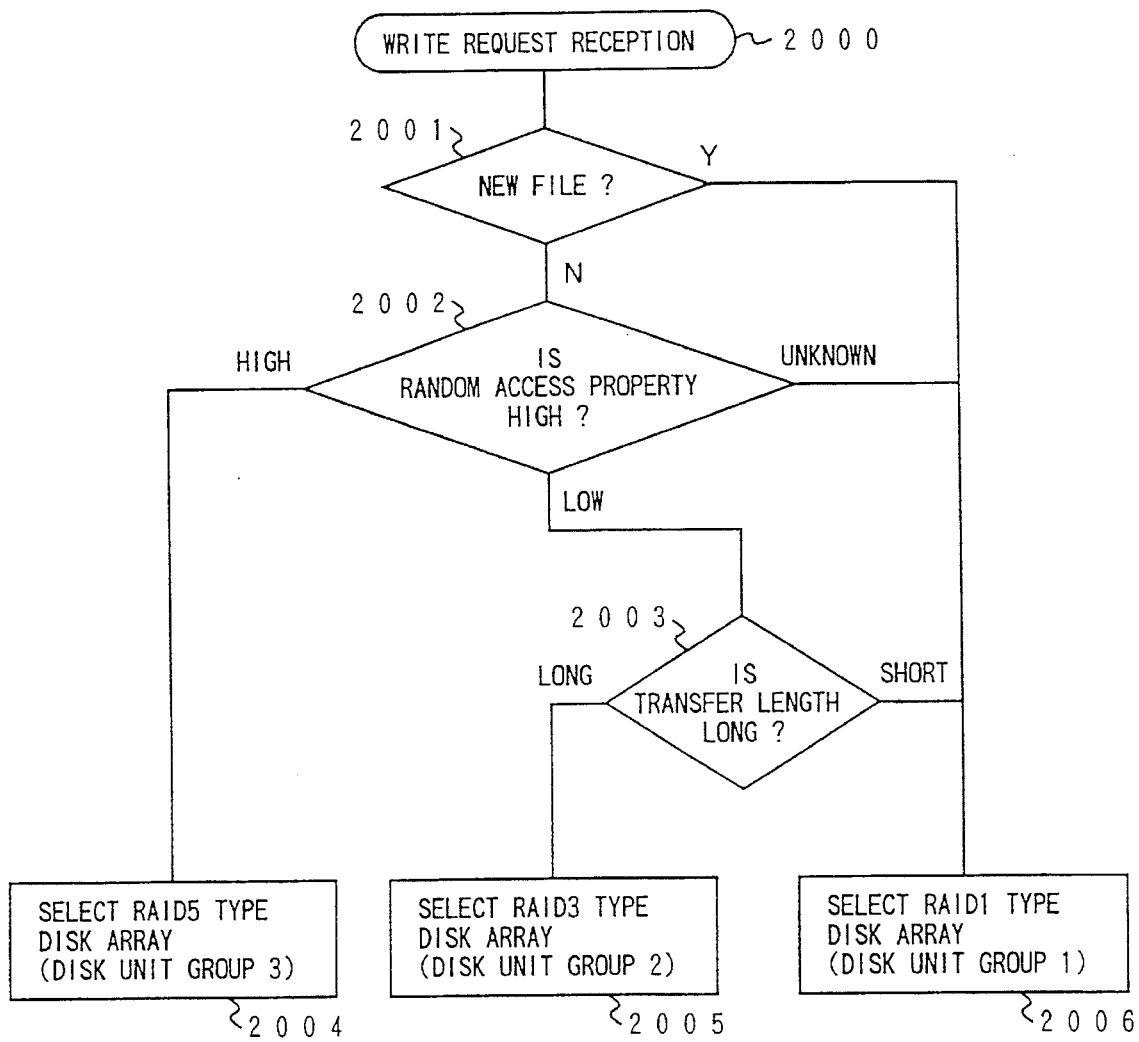
FIG. 20 is a flowchart showing a disk unit group selection procedure according to the fifth embodiment of the invention.

On the other hand, if the command from the host computer 1 is a request for registering a new logical block, first the new file address determination means 26 determines which disk unit group the logical block is to be registered in according to a procedure shown in FIG. 20.

When the new file address determination means 26 receives the write request at step 2000, whether or not the file to which the logical block to be written is new or already exists is determined at step 2001. If it is a new file, the characteristics of the file are unknown, then the RAID1 type disk array (disk unit group 1) is temporarily selected at step 2006.

On the other hand, if the file to which the logical block to be written is an already existing file, the random access property of the file is checked at step 2002 using the local file management table 27.

Figure 21:
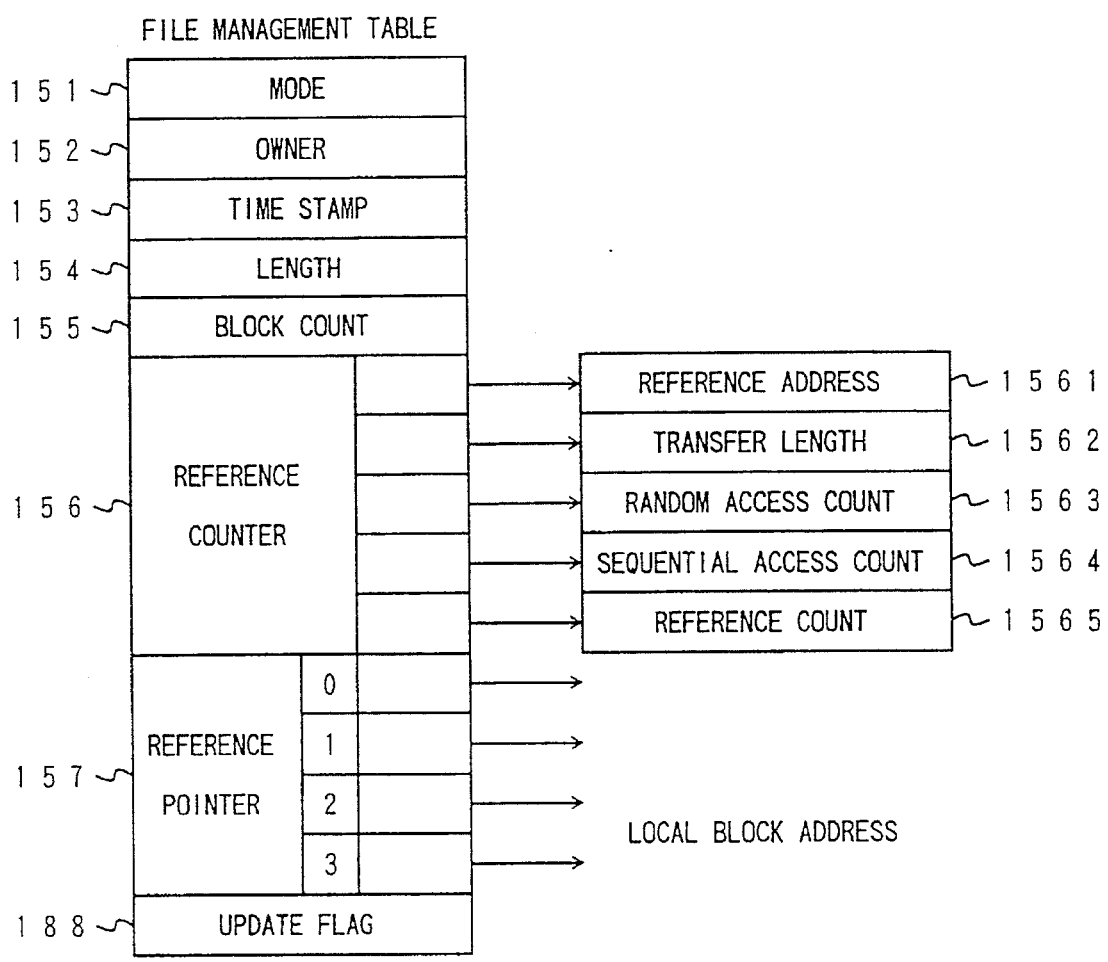
FIG. 21 is an illustration showing the format of a local file management table according to the fifth embodiment of the invention.

As shown in FIG. 21, a reference count field 156 of file management information for each file in the local file management table is provided with five subfields for determining the access characteristic. The first subfield is a field 1561 which stores the reference address in response to the previous request from the host computer (the byte count from the top of the file); the second subfield is a field 1562 which stores the transfer length (the number of bytes) at the previous reference; the third subfield is a field 1563 which indicates the random access count; the fourth subfield is a field 1564 which indicates the sequential access count; and the fifth subfield is a field 1565 which stores the total number of times the file has been referenced. Each time the file is accessed, the random access count field 1563 and the sequential access count field 1564 are updated as follows:

The expression $$\text{current reference address} \leq \text{previous reference address} + \text{previous transfer length} + \alpha$$

is evaluated. If the expression is true, the access is judged to be sequential, and one is added to the sequential access count subfield 1564. If the expression is not true, the access is judged to be a random access, and one is added to the random access count subfield 1563. In the expression, the term "current reference address" is the location from the top of the file in response to the current write request from the host computer (the byte count), and $\alpha$ is a criterion constant for the sequential property. To judge that only a completely continuous access is sequential, $\alpha$ may be set to 0. To judge the sequential property in some range, $\alpha$ may set to some value. The random or sequential property is thus determined each time the file is accessed.

Returning to step 2002, FIG. 20, the random access property of the existing file, namely, whether the random access property of the file is high or low is determined as follows:

Assume that A and B are proper setup values. If the value of the reference count field 1565 of the file management information corresponding to the file is greater than A and the value of the random access count field 1563/value of the reference count field 1565 is equal to or greater than B, the random access property is judged to be high; if the value of the reference count field 1565 is greater than A and the value of the random access count field 1563/value of the reference count field 1565 is less than B, the random access property is judged to be low. If the value of the reference count field 1565 is less than A, it is determined that judgement is impossible, because if the reference count is less than the given value A, the file has just been prepared and the sequential or random property cannot be judged for the file.

Next, if the random access property is high as a result of the judgement, the RAID5 type disk array (disk unit group 3) is selected at step 2004; if the judgement is impossible, the RAID1 type disk array (disk unit group 1) is selected at step 2006, because the file which has just been prepared should be stored in the RAID1 type disk array (disk unit group 1).

Whether or not random access ratio (random access count/reference count) is greater than the constant B ($0<B\leq 1$) is determined at step 2002, but the sequential access ratio may be judged based on the value of sequential access count field 1564/value of reference count field 1565 or both are used for determination.

If the random access property is judged to be low at step 2002, the transfer length is judged. If the length of data whose write is requested in the command (transfer length) is greater than a given value C, the transfer length is judged to be long, and the RAID3 type disk array (disk unit group 2) is selected. If the transfer length is less than the given value C, the RAID1 type is selected because the RAID3 type is inefficient.

Thus, an appropriate disk unit group is selected by determining whether or not the new file is an existing file, has high random access property, and has long transfer length. The new logical block is written into the selected disk unit group. If the selected disk unit group differs from the disk unit group in which the already existing logical blocks of the existing file to which the new logical block belongs are stored, the existing logical blocks are moved to the selected disk unit group and the file management table is updated accordingly. At this time, an update flag 188, provided in file management information for each file in the local file management table 27, indicating whether or not the file has been relocated is set to "updated."

In the example, all new files shall be written into the RAID1 type disk array (disk unit group 1), because the access characteristics of the new files are unknown. However, the RAID1 type disk array has performance equivalent to one disk unit except that it has high reliability; it is not suitable for files having high random access property or files having high sequential access property. Since the RAID1 typed disk array also has a limited disk capacity, a disk unit group fitted to the access characteristic of each file is preferably selected again at proper timing to move the file.

Then, the disk unit group update controller 1800 issues periodically a request for again selecting a disk unit group for storing each file to the command management means 23.

When receiving the request, the command management means 23 references the update flag 188 of the file management information corresponding to each file in the local file management table 27. If the update flag 188 is set to "unupdated," which indicates that the file is a new one which has been recently created, the command management means 23 starts the disk unit group selector for attempting to reselect a disk unit group according to the procedure shown in FIG. 20.

If it is determined that the file has a high random or sequential access property, a disk unit group is selected as described above. If a disk unit group other than the RAID1 type disk array (disk unit group 1) is selected, the file is moved to the disk unit group and the update flag 188 is set to "updated."

If the determination is impossible, the file is left in the disk unit group 1 intact. At this time, the update flag 188 remains "unupdated." When the file is being moved, the host computer may issue a request for accessing the file. Thus, during this time, the update file is set to "updating." In response to moving the file, the file management information in the file management table corresponding to the file is newly prepared. Upon completion of the file movement, the file management table is updated to the new file management information and the old one is deleted. After the disk unit group is selected, logical block addresses may be registered in local block addresses as described above.

The disk unit group fitted to the access characteristic can now be selected.

Examples using the disk arrays of the RAID1, RAID3, and RAID5 types as the disk unit groups have been given. However, if other devices are introduced, the disk unit group fitted to the access characteristic can be selected according to a similar procedure.

Figure 22:
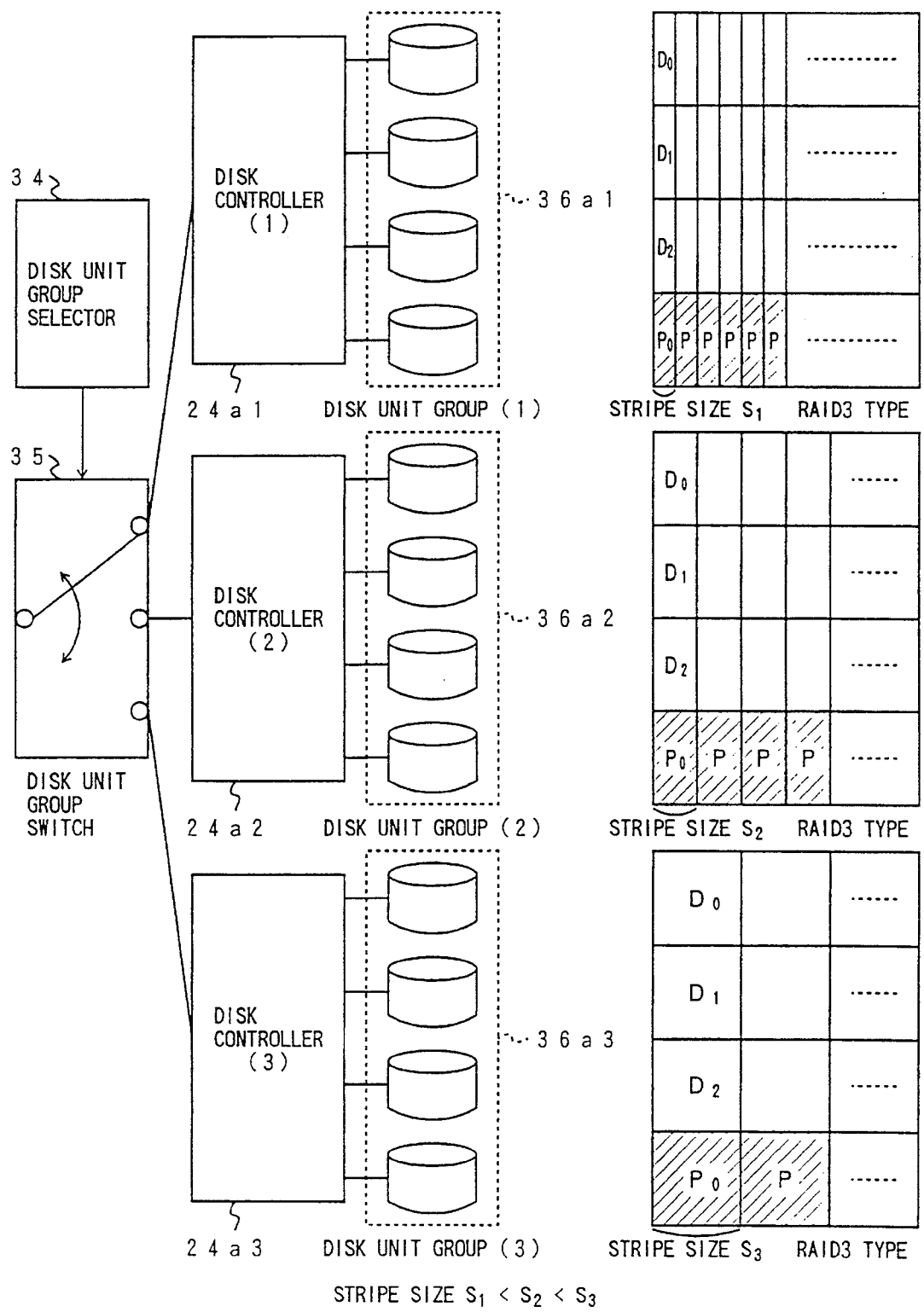
FIG. 22 is a block diagram showing a second specific configuration example of the secondary storage system according to the fifth embodiment of the invention.

The disk unit groups according to the fifth embodiment (see FIG. 19) can also be configured as shown in FIG. 22.

In the example shown in FIG. 22, three disk array systems, which differ in stripe size, one of the configuration parameters, are used as disk unit groups 1, 2, and 3.

In the example, comparatively small files should be stored in the disk unit group 1 for which a small stripe size is set; in contrast, sufficiently large files should be stored in the disk unit group 3 for which a large stripe size is set. Therefore, if one of the disk unit groups is selected according to the file length, the disk unit group fitted to the file characteristics can be selected. Alternatively, if a disk unit group such that the stripe size ×number of disk units×n equals the transfer length is selected according to the data transfer length, transfer performance of as many as the number of disk units can be provided efficiently.

Figure 23:
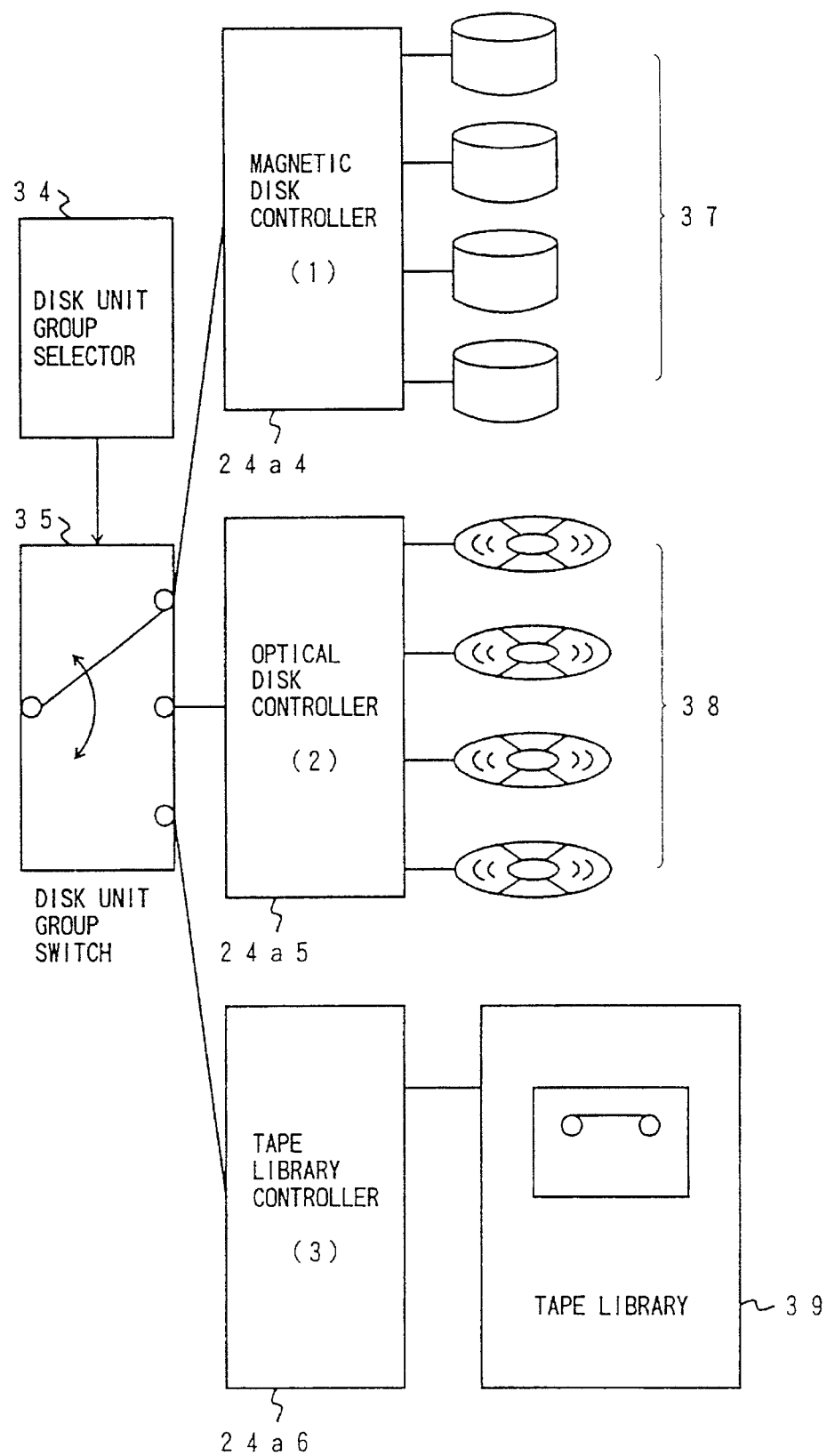
FIG. 23 is a block diagram showing a third specific configuration example of the secondary storage system according to the fifth embodiment of the invention.

The disk unit groups according to the fifth embodiment (see FIG. 19) can also be configured as shown in FIG. 23.

In the example shown in FIG. 23, a magnetic disk storage system 37 is used as the disk unit group 1, an optical disk storage system 38 as the disk unit group 2, and a tape library system 39 as the disk unit group 3. In the example, preferably, frequently accessed files are registered in the magnetic disk storage system, not much frequently accessed files are registered in the optical disk storage system, and scarcely accessed files (for backup, etc.,) are registered in the tape library system.

Then, every given time, the disk unit group update controller 1800 issues a request for again selecting a disk unit group for storing each file to the command management means 23. When receiving the request, the command management means 23 references the previous reference time of the time stamp 153 and the reference count field 1565 of the file management information corresponding to each file in the local file management table 27 to determine whether or not the file was accessed recently or whether or not the file has been frequently referenced. If the file has not been accessed for a given period of time, it is an old file. It is inefficient for the file to occupy space on a high speed disk. Then, the file is moved to the high speed optical disk storage system, for example.

Files stored in other disk units may be copied into the tape library system at night for backup, for example.

Thus, according to the embodiment, a plurality of disk unit groups can be installed in the secondary storage system and mapping of logical blocks into local block addresses fitted to diversified access requests and file characteristics can be accomplished by changing the configuration; various forms of storage systems and computer systems can be constructed.

As described above, according to the invention, file placement optimization can be made considering the configuration parameters and physical parameters proper to the secondary storage system and matching the AP access characteristics of the host computer and a high speed file access can be made, whereby a high performance computer system can be provided. Not only the secondary storage systems of the invention, but also conventional secondary storage systems can be connected to the host computer for constructing a flexible computer system. Since the host computer need not consider the configuration and physical characteristics of the secondary storage systems, various secondary storage systems can be easily connected to the host computer. A distributed file management type computer system in which a plurality of host computers and secondary storage systems are connected can also be easily constructed.

Thus, according to the invention, a computer system which can accomplish optimum placement of files in the secondary storage systems can be provided without setting the parameters of the secondary storage systems in the host computer.

Many different embodiments of the present invention may be constructed without departing from the spirit and scope of the invention. It should be understood that the present invention is not limited to the specific embodiments described in theis specification. The the contrary, the present invention is intended to cover various modifications and equivalent arrangements included within the spirit and scope of the claims.

What is claimed is:

1. A computer system, comprising
   a computer; and
   at least one of a plurality of secondary storage systems connected to said computer which manages data stored therein by using local addresses thereof, wherein
   said secondary storage system comprises:
      means for storing a file including one or more logical blocks,
      means for executing an access to a logical block, already stored in said storage means, at the local address requested by said computer,
      means for determining a local address in the secondary storage system to store a new logical block requested to be stored according to a predetermined procedure, when said computer requests storing said new logical block in said storage means,
      means for storing the new logical block requested to be stored in the determined local address, and
      means for notifying said computer of the determined local address; and further wherein
   said computer comprises:
      a file management table for relating local addresses where logical blocks making up a file stored in said secondary storage system are stored as logical blocks and managing a correspondence therebetween,
      means for referencing said file management table to find a local address of a logical block to be accessed and sending a request for accessing the logical block at the found local address to said secondary storage system, when the logical block already stored in said secondary storage system is accessed,
      means for sending a request for storing a new logical block to said secondary storage system without specifying a local address, when the new logical block is stored in said secondary storage system, and
      means for relating the local address returned from said secondary storage system to the new logical block requested to be stored and registering a correspondence therebetween in said file management table.

2. The computer system as claimed in claim 1, wherein
   said storage means in said secondary storage system is a disk array system, and
   said means for determining a local address to store the logical block according to a predetermined procedure includes means for finding according to a predetermined procedure a local address so as to enable data belonging to the logical block to be accessed in a parallel manner.

3. The computer system as claimed in claim 1, wherein
   said storage means in said secondary storage system includes a plurality of storage systems of different types, and
   said means for determining a local address to store the logical block according to a predetermined procedure determines a local address of a new logical block in response to characteristics of a file to which the new logical block to be stored belongs and characteristics of said plurality of storage systems.

4. A computer to which at least one of secondary storage systems is connected, said computer comprising:
   a file management table for managing local addresses where logical blocks making up a file stored in said secondary storage system are stored as logical blocks and managing a correspondence therebetween;
   means for determining whether or not each of said secondary storage systems connected to said computer has a capability of determining a local address to store a logical block;
   means for sending a request for accessing a logical block to said second storage system with specification of a local address of logical block to be accessed, found by referencing said file management table when the logical block already stored in said secondary storage system is accessed;

means for sending a request for storing a new logical block to said secondary storage system without specifying a local address, when the new logical block is stored in said secondary storage system having a capability of determining the local address to store the logical block;

means for relating a local address returned from said secondary storage system having a capability of determining a local address to store a logical block in response to the request for storing the new logical block to the new logical block requested to be stored and registering a correspondence therebetween in said file management table;

means for determining a local address to store a new logical block according to a predetermined procedure, when the new logical block is stored in said secondary storage system having no capability of determining the local address to store the logical block;

means for storing the determined local address in said file management table; and means for sending a request for storing a new logical block to said secondary storage system having no capability of determining a local address to store a logical block with specification of the determined local address.

5. The computer system as claimed in claim 4, wherein said storage means in said secondary storage system includes a disk array system, and said means for determining a local address to store the logical block according to a predetermined procedure includes means for finding, according to a predetermined procedure, a local address so as to enable data belonging to the logical block to be accessed in a parallel manner.

6. The computer system as claimed in claim 4, wherein said storage means in said secondary storage system includes a plurality of storage systems of different types, and said means for determining a local address to store the logical block according to a predetermined procedure determines a local address of a new logical block in response to characteristics of a file to which the new logical block to be stored belongs and characteristics of said plurality of storage systems.

7. A computer to which at least one of secondary storage systems is connected, said computer comprising:

a file management table for managing local addresses where logical blocks making up a file stored in said secondary storage system are stored as logical blocks and managing a correspondence therebetween;

means for determining whether or not each of said secondary storage systems connected to said computer has a capability of determining a local address to store a logical block;

means for sending a request for accessing a logical block to said second storage system with specification of a local address of the logical block to be accessed, found by referencing said file management table, when the logical block already stored in said secondary storage system is accessed;

means for determining a local address to store a new logical block according to a predetermined procedure, when the new logical block is stored in said secondary storage system having no capability of determining the local address to store the logical block;

means for relating the determined local address of the logical block to the logical block and storing a correspondence therebetween in said file management table;

means for sending a request for storing the new logical block to said secondary storage system having no capability of determining a local address to store a logical block with specification of the determined local address; and means for sending a request for storing a new file to said secondary storage system with specification of a file identification representing the file, a relative address of data to be accessed in the file, and an accessed data length, when the new file is stored in said secondary storage system having a capability of determining a local address to store a logical block.

8. The computer system as claimed in claim 7, wherein said storage means in said secondary storage system includes a disk array system, and said means for determining a local address to store the logical block according to a predetermined procedure includes means for finding, according to a predetermined procedure, a local address so as to enable data belonging to the logical block to be accessed in a parallel manner.

9. The computer system as claimed in claim 7, wherein said storage means in said secondary storage system includes a plurality of storage systems of different types, and said means for determining a local address to store the logical block according to a predetermined procedure determines a local address of a new logical block in response to characteristics of a file to which the new logical block to be stored belongs and characteristics of said plurality of storage systems.

10. In a computer system comprising storage media and at least one of a plurality of secondary storage systems connected via a peripheral input/output device bus to said computer, a method of accessing a file comprising the steps of:

providing said secondary storage system with a local file management table for relating file identification information for identifying files to local addresses where the files are stored and storing a correspondence therebetween:

requesting said secondary storage system to store a new file by said computer specifying file identification information of the file;

determining a local address to store the new file requested to be stored by said secondary storage system;

storing the new file in the determined local address of said storage medium by said secondary storage system;

relating the determined local address to the specified file identification information and storing a correspondence therebetween in said local file management table by said secondary storage system;

notifying said computer of the determined local address by said secondary storage system;

relating the received local address to the file requested to be stored and managing a correspondence therebetween by said computer;

providing said computer with a file management table for storing a correspondence between file identification information for identifying files and local addresses where the files are stored;

finding, when accessing a previously stored file in said secondary storage system, a local address corresponding to the file from said file management table by computer;

accessing a file already stored in said secondary storage system, finding a local address related to the file from said file management table by said computer;

sending a request for accessing the file already stored in said secondary storage system with specification of the found local address to said secondary storage system by said computer; and upon receipt of the request for accessing the file already stored in said secondary storage system, accessing the file at the local address specified in the request by said secondary storage system.

11. A computer system comprising:

a computer; and at least one of a plurality of secondary storage systems connected to said computer as a peripheral exclusive used by said computer, said at least one of secondary storage system manages data stored therein by using local addresses thereof, wherein:

said secondary storage system comprises:

means for storing a file consisting of one or more logical blocks, means for executing an access to a logical block, already stored in said storage means, at the local address requested by said computer, when said computer requests storing a new logical block in said storage means, means for determining a local address to store the logical block requested to be stored according to a predetermined procedure, means for storing the logical block requested to be stored in the determined local address, and means for notifying said computer of the determined local address, and further wherein:

said computer comprises:

a file management table for relating local addresses where logical blocks making up a file stored in said secondary storage system are stored as the logical blocks and managing a correspondence therebetween, means for referencing said file management table to find a local address of a logical block to be accessed and sending a request for accessing the logical block at the found local address to said secondary storage means, when the logical block already stored in said secondary storage system is accessed, means for sending a request for storing a new logical block to said secondary storage system without specifying a local address, when the new logical block is stored in said secondary storage system, and means for relating the local address returned from said secondary storage system to the new logical block requested to be stored and registering a correspondence therebetween in said file management table.

\* \* \* \* \*

UNITED STATES PATENT AND TRADEMARK OFFICE
CERTIFICATE OF CORRECTION

PATENT NO. : 5,619,690
DATED : April 8, 1997
INVENTOR(S) : Matsunami, et. al.

It is certified that error appears in the above-indentified patent and that said Letters Patent is hereby corrected as shown below:

Title page, item [75], inventor: delete "Matsumani" and insert -- Matsunami --.

Signed and Sealed this

Twenty-fifth Day of August, 1998

Attest:

Attesting Officer

BRUCE LEHMAN

Commissioner of Patents and Trademarks